US010419948B1

(12) United States Patent
Labadie et al.

(10) Patent No.: US 10,419,948 B1
(45) Date of Patent: Sep. 17, 2019

(54) AERIAL REFLECTORS FOR TERRESTRIAL NON-LINE-OF-SIGHT NLOS COMMUNICATION

(71) Applicant: Amazon Technologies, Inc., Seattle, WA (US)

(72) Inventors: Nathan Labadie, Santa Clara, CA (US); Jin Dong Kim, Santa Clara, CA (US); Adrian Napoles, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 15/863,004

(22) Filed: Jan. 5, 2018

(51) Int. Cl.

| | |
|---|---|
| ***H01Q 3/20*** | (2006.01) |
| ***H04W 16/26*** | (2009.01) |
| ***H01Q 15/14*** | (2006.01) |
| ***H01Q 3/00*** | (2006.01) |
| ***H01Q 3/08*** | (2006.01) |

(52) U.S. Cl.
CPC ............ *H04W 16/26* (2013.01); *H01Q 3/005* (2013.01); *H01Q 3/08* (2013.01); *H01Q 3/20* (2013.01); *H01Q 15/14* (2013.01)

(58) Field of Classification Search
CPC ............ H01Q 3/005; H01Q 3/08; H01Q 3/20; H01Q 15/14; H04W 16/26
See application file for complete search history.

*Primary Examiner* — Graham P Smith
(74) *Attorney, Agent, or Firm* — Lowenstein Sandler LLP

(57) ABSTRACT

Network hardware devices are organized in a wireless mesh network (WMN) including multiple home access node (HAN) relay devices located in a geographic area and separated from one another by a distance. To avoid an obstruction preventing terrestrial line-of-sight (LOS) communications, an aerial reflector is deployed for terrestrial non-line-of-sight (NLOS) communications between first and second HAN relay devices. The aerial reflector device is positioned at an aerial location above a first terrestrial location of the first HAN relay device and a second terrestrial location of the second HAN relay device. The aerial reflector device includes a reflective surface that is positioned and oriented to provide terrestrial NLOS communications between a radio of the first HAN relay device and a radio of the second HAN relay device.

20 Claims, 19 Drawing Sheets

930
Flight path
936
Control Line
Thruster
934
Payload
Reflector
938
Tethers
939

Drone Axes
Up/Down
Reflector Axes
Azimuth
Elevation
920
Hover
Thruster
926
Multi-copter
924
Payload
Reflector
928
Tethers
929
908

900
916
Hover
Balloon
Payload
914
Reflector
918
Tethers
919

AERIAL REFLECTORS FOR TERRESTRIAL NON-LINE-OF-SIGHT NLOS COMMUNICATION

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present embodiments will be understood more fully from the detailed description given below and from the accompanying drawings of various embodiments, which, however, should not be taken to limit the claims to the specific embodiments, but are for explanation and understanding only.

DETAILED DESCRIPTION

Figure 1A:
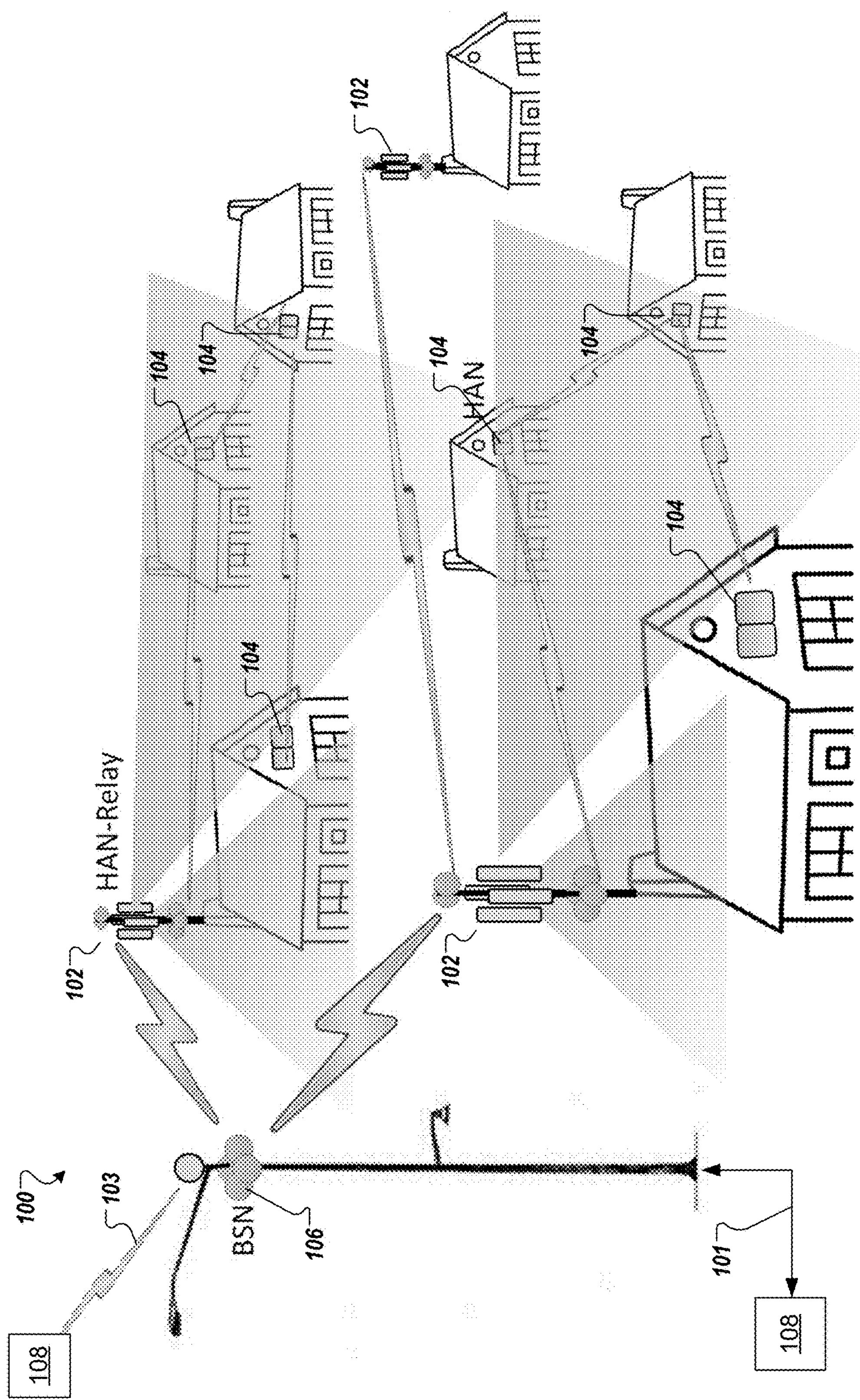
FIG. 1A is a network diagram of network hardware devices, organized in a wireless mesh network (WMN), for providing broadband connectivity to broadband Internet infrastructure according to one embodiment.

A wireless mesh network (WMN) containing multiple mesh network devices, organized in a multi-level mesh topology, is described. The mesh network devices in the WMN cooperate to provide broadband connectivity to broadband Internet infrastructure. The embodiments described herein may be implemented as suitable broadband Internet infrastructure in suburban geographic areas as described herein. The WMN may be deployed in a suburban environment to provide broadband connectivity to a home as an alternative to traditional wired internet service providers (ISPs). The WMN may use a combination of fixed wireless and mesh networking to deliver wireless broadband to a suburban home. Some outdoor fixed wireless links have been able to provide 50 Mbps over a distance of 18 kilometers. By overlaying a mesh network in a various mesh topologies (e.g., star topology, peer-to peer topology, mesh pattern topology, or the like), the WMN may provide wireless broadband to a block of homes within proximity in a suburban environment. Such a network would allow customers to access to the Internet for web services, content streaming, or the like.

Described herein are various types of network hardware devices, including BSN devices, HAN relay devices, and HAN devices to provide broadband connectivity to broadband Internet structure. Multiple network hardware devices are connected wirelessly through a first sub-mesh network and other network hardware devices are connected wirelessly through a second sub-mesh network. Multiple network hardware devices are connected together over point-to-point (PtP) wireless connections using beam-steering antennas as described in more detail herein. The first sub-mesh network may be considered the backhaul and the second sub-mesh network can be considered the access. Other sector antennas may be used to wirelessly connect devices over point-to-multiple-points (PtMP) wireless connections. These antennas may be fixed-beam antennas as they are not beam-steering antennas used for PtMP wireless connections.

As described in various embodiments herein, the network hardware devices are organized in a WMN in which a HAN relay device that includes a first set of radios, each of the first set of radios being coupled to a beam-steering antenna and each of the first set of radios establishing a first point-to-point (PtP) wireless connection over which the HAN relay device communicates with a second HAN relay device in a first sub-mesh network of HAN relay devices. The HAN relay device also includes a second set of radios, each of the second set of radios being coupled to a beam-steering antenna and each of the second set of radios establishing a second PtP wireless connection over which the HAN relay device communicates with at least one of multiple HAN devices in a second sub-mesh network in the WMN. In other embodiments, the WMN includes a base station node (BSN) device connected to a tower in a geographic area and multiple HAN relay devices located in a geographic area and separated from one another by a distance up to approximately 500 meters. Each of the first set of HAN relay devices establishes one or more frequency-division duplexing (FDD) links between itself and at least one other HAN relay device and at least one of the first set of HAN relay devices establishes a time-division duplex (TDD) link over which the at least one of the HAN relay devices communicates with the BSN device. FDD is a method for establishing a full-duplex communications link that uses two different radio frequencies for transmitter and receiver operations. The transmit direction and receive direction frequencies are separated by a defined frequency offset.

Also, as described herein, one system includes a first HAN relay device positioned at a first terrestrial location, a second HAN relay device positioned at a second terrestrial location; and an aerial reflector device capable of being positioned at an aerial location above the first terrestrial location and the second terrestrial location. The aerial reflector device includes a reflective surface that can be positioned and oriented to provide terrestrial NLOS communications between a radio of the first HAN relay device and a radio of the second HAN relay device. The aerial reflector device is positioned in the aerial location using at least one of mechanical mechanism, an aero-dynamical mechanism, or a buoyancy mechanism, as described in various embodiments herein. The aerial location can be at an altitude between approximately 10 meters and 20 kilometers above the first terrestrial location and the second terrestrial location. In other embodiments, the aerial location can be other altitudes in the troposphere, stratosphere, or any altitude below a low earth orbit.

As described herein, the network hardware devices can provide broadband connectivity to broadband Internet infrastructure to various consumer devices, such as laptop computers, desktop computers, televisions, tablet computers, home automation systems, personal digital assistants, or the like. In the case of client consumption devices, the WMN can provide broadband connectivity to content files, as well as other web-based services. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In some of the embodiments described herein, the mesh network architecture may include a limited number of point-of-presence (POP) nodes that have access to the Internet, and the hardware network devices of the two sub-mesh networks can distribute data between the POP nodes and the client devices. In some cases, the WMN can be deployed in a geographical area in which broadband Internet is limited. In other cases, the WMN can be deployed in suburban areas as an alternative to traditional wired infrastructures for broadband Internet. The WMN can scale to support a geographic area based on the number of mesh network devices, and the corresponding distances for successful communications over the wireless channels by those hardware network devices.

Although various embodiments herein are directed to content delivery, such as for the Amazon Instant Video (AIV) service, the WMNs, and corresponding mesh network devices, can be used as a platform suitable for delivering high bandwidth content in any application. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in suburban environments in particular. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIG. 1A is a network diagram of network hardware devices, organized in a WMN 100, for providing broadband connectivity to broadband Internet infrastructure according to one embodiment. The WMN 100 includes multiple network hardware devices that connect together to transfer digital data through the WMN 100 to be delivered to one or more client devices (not illustrated in FIG. 1A) connected to the WMN 100. The WMN 100 includes two sub-mesh networks: a first sub-mesh network of HAN relay devices 102 and a second sub-mesh network of HAN devices 104. The WMN 100 also includes a BSN device 106 that wirelessly connects to the HAN relay devices 102. The BSN device 106 may operate as a point-of-presence device that has a wired connection 101 to broadband Internet infrastructure 108, a wireless connection 103 to broadband Internet infrastructure 108, or both. The wireless connection 103 may be a point-to-point (PtP) wireless connection to a CDN device (server of a CDN or a CDN node) of an Internet Service Provider (ISP). The CDN device may be a POP device (also referred to as a POP device), an edge server, a content server device, or another device of the CDN. The BSN device 106 can act as a single ingress point to the WMN 100, whereas the POP device of the broadband Internet infrastructure may be one of many in a CDN. Alternatively, the WMN 100 may include more than one BSN device 106 as described herein, and the BSN device 106 may act as one of multiple ingress points to the WMN 100. In other embodiments, multiple BSN devices 106 may be deployed in the WMN 100, but the number of BSN devices 106 should be much smaller than a total number of network hardware devices (102, 104) in the WMN 100. In one embodiment, the BSN device 106 is a single gateway device to provide Internet connectivity to the HAN devices 104 and HAN relay devices 102 within the WMN 100. In another embodiment, the BSN device 106 is one of multiple gateway devices to provide Internet connectivity to the HAN devices 104 and HAN relay devices 102 within the WMN 100. The wireless connection 103 may be a directional microwave link between the BSN device 106 and another device of the broadband Internet infrastructure. Although a point-to-point wireless connection can be used, in other embodiments, other communication channels may be used. For example, a microwave communication channel may be used to exchange data. Other long distance communication channels may be used, such as a fiber-optic link as the wired connection 101, satellite link, cellular link, or the like. It should be noted that not all the hardware network devices (HAN relay devices 102, HAN devices 104) may not have direct access to the BSN device 106, but can use one or more intervening nodes to transfer data between the hardware network devices and the BSN device 106. The intervening nodes may also cache digital data that can be accessed by other nodes. The network hardware devices may also determine a shortest possible route between the requesting node and a node where the digital data is stored.

In some scenarios of a WMN, a line of sight (LOS) terrestrial communication typically requires expensive and tall radio towers to avoid obstructions, such as tree and building blockages. Radio towers can be expensive, potentially requiring recurring and non-recurring costs and may require extensive permitting and valuable time to deploy hardware network devices in the WMN. Radio tower locations are often sparse and may be positioned in non-ideal locations. As described in various embodiments herein, aerial reflector devices can be used to provide NLOS communication between ground base radios (e.g., radios of HAN relay devices or radios of HAN devices). The aerial reflector devices can be used in connection with a wide range of frequencies in microwave, millimeter wave, and optical bands. The aerial reflector devices can be lower complexity, light weight, and compact. The aerial reflector devices can also be more sophisticated with materials or passive or active electronics to control beam shapes and directions of the reflected electromagnetic energy, such as adjusting a width of the reflected radiation pattern, adjusting a shape of the radiation to focus the reflected energy. The aerial reflector devices can also be made up of an array of MEMs devices that can act like an adjustable mosaic of mirror elements to change direction and shape of the reflected electromagnetic energy. The aerial reflector devices may improve the signaling between two devices that have partial LOS or NLOS. The aerial reflector devices may provide NLOS communication paths to avoid obstructions that are present in the LOS between two devices. The aerial reflector devices result in more diagonal signaling that does not go beyond the target, as is the case for horizontal signaling between devices in a horizontal plane. As described herein, the aerial reflector devices can have different platforms for aerial positioning (e.g., multi-copter drones, balloon air-crafts, kites, pole mount assemblies, or the like). The aerial reflectors devices may provide PtP and PtMP connectivity between the network devices described herein and can support single input, single output (SISO) and multiple input, multiple output (MIMO) functionality of the radios.

Figure 1B:
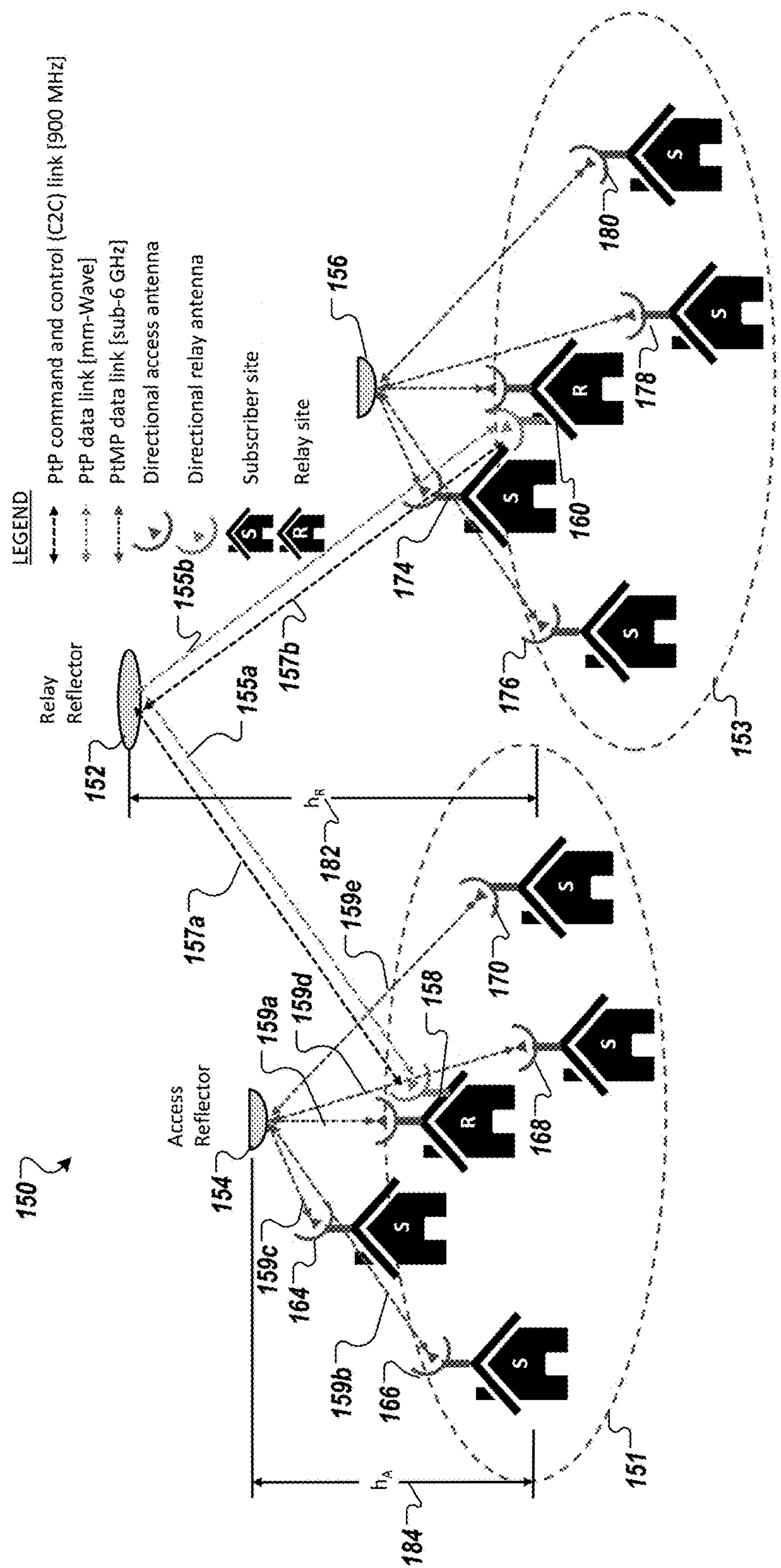
FIG. 1B is a network diagram of a WMN having a relay reflector and access reflectors for terrestrial NLOS communications between network hardware device according to one embodiment.

FIG. 1B is a network diagram of a WMN 150 having a relay reflector device 152 and access reflector devices 154, 156 for terrestrial NLOS communications between network hardware device according to one embodiment. In this depicted embodiment, a first HAN relay device 158 is positioned at a first terrestrial location within a geographic area 151, a second HAN relay device 160 is positioned at a second terrestrial location with a geographic area 153, and an aerial reflector device, labeled relay reflector device 152, is capable of being positioned in an aerial location above the first terrestrial location and the second terrestrial location. The aerial location is at an altitude 182 (labeled $h_R$ 182) between approximately 10 meters and 20 kilometers above the first terrestrial location and the second terrestrial location. The first HAN relay device 158 has a radio to communicate data with a radio of the second HAN relay device 160. The first HAN relay device 158 uses a directional antenna coupled to the radio to radiate electromagnetic energy towards the aerial reflector device 152. The aerial reflector device 152 includes a reflective surface that can be positioned and oriented to provide a terrestrial NLOS communication path between the radio of the first HAN relay device and the radio of the second HAN relay device. The reflective surface is capable of reflecting the electromagnetic energy received from the directional antenna of the first HAN relay device 158 towards a directional antenna of the second HAN relay device 160. Similarly, the reflective surface is capable of reflecting electromagnetic energy received from the directional antenna of the second HAN relay device towards the directional antenna of the first HAN relay device 158. The reflective surface can be a flat circular disc. In other embodiments, the reflective surface can be curved in a dish shape. Alternatively, the reflective surface can have other shapes and properties. As described herein the reflective surface can be made up of passive materials, active materials, or active components, such as MEMs devices. In one embodiment, multiple active components can be used to control the reflective surface to beam-form a radiation pattern of reflected electromagnetic energy from the reflective surface in an active or controlled manner.

In another embodiment, the aerial reflector device includes a GNSS radio, a radio to communicate data over a wireless link with a first radio of a first network device, a first radio of a second network device, or both. The aerial reflector device also includes an accelerometer, a positioning subsystem, and the micro-controller. The micro-controller is configured to position the aerial reflective device in an aerial location above the first network device and the second network device to provide NLOS communications between the first radio of the first network device and the first radio of the second network device. In a further embodiment, to position the aerial reflective device, is configured to: receive, over the wireless link via the radio, control data comprising a specified location of the aerial reflective device and a specified orientation of the reflective surface; determine a current location of the aerial reflector device and a current orientation of the reflective surface using first data obtained from the GNSS radio and second data from the accelerometer; determine a first adjustment, if any, to move the aerial reflective device to the specified position; determine a second adjustment, if any, to orient the reflective surface to the specified orientation; communicate one or more control signals to the drone, the positioning subsystem, or both to make the first adjustment, if any, and the second adjustment, if any.

In one embodiment, the terrestrial NLOS communication path may include a communication path 155*a*, 155*b* for data and a communication path 157*a*, 157*b* for command and control (C2C). A PtP data link can be established between the radio of the first HAN relay device 158 and the radio of the second HAN relay device 160 over the communication path 155*a*, 155*b*. The PtP data link has two segments: a first segment 155*a* between the directional antenna of the first HAN relay device 158 at the first terrestrial location and the aerial reflector device 152 at the altitude 182 and a second segment 155*b* between the aerial reflector device 152 and a directional antenna of the second HAN relay device at the second terrestrial location. A C2C link can be established between the radio of the first HAN relay device and the radio of the second HAN relay device 160 over the communication path 157*a*, 157*b*. The C2C link has two segments: a first segment 157*a* between the directional antenna of the first HAN relay device 158 at the first terrestrial location and the aerial reflector device 152 at the altitude 182 and a second segment 157*b* between the aerial reflector device 152 and a directional antenna of the second HAN relay device 160 at the second terrestrial location.

In a further embodiment, the first HAN relay device 158 at the first terrestrial location includes one or more additional radios to communicate data via LOS or NLOS communication paths to a set of one or more HAN devices. Each HAN device is an access point that provides Internet connectivity to a client consumption device connected to the respective HAN device at a subscriber site (labeled as S structures). The depicted embodiment illustrates the first HAN relay device 158 communicating with four HAN devices 164, 166, 168, and 170 via NLOS communication paths via another aerial reflector device, labeled access reflector device 154. The access reflector device is capable of being positioned in an aerial location above the first terrestrial location. The aerial location is at an altitude 184 (labeled $h_A$ 184) between approximately 10 meters and 20 kilometers above the first terrestrial location. The first HAN relay device 158 communicates data with the HAN device 166 by radiating electromagnetic energy from a directional antenna towards the access reflector device 154 on a segment 159*a* of a NLOS communication path. The reflective surface of the access reflector device 154 reflects the electromagnetic energy towards a directional antenna of the HAN device 166 on a segment 159*b* of the NLOS communication path. The HAN device 166 can radiate electromagnetic energy via its directional antenna towards the reflective surface of the access reflector device 154 and the reflective surface reflects the electromagnetic energy towards the directional antenna of the first HAN relay device 158. The first HAN relay device 158 can also communicate data to the other HAN devices 164, 168, and 170 in a similar fashion. For example, the first HAN relay device 158 communicates with the HAN device 164 over segments 159*a* and 159*c*, the HAN device 168 over segments 159*a* and 159*d*, and HAN device 170 over segments 159*a* and 159*e*.

Although FIG. 1B shows the first HAN relay device 158 communicating with all four of the HAN devices with terrestrial NLOS communication paths, in other embodiments, the first HAN relay device 158 can communicate with terrestrial NLOS communication paths with zero or more HAN devices and with terrestrial LOS communication paths with zero or more HAN devices. Similarly, the second HAN relay device 160 communicates with a second set of HAN devices 174, 176, 178, and 180 over terrestrial NLOS communication paths using a second access reflector device 156. Similarly, the second HAN relay device 160 can communicate with any combination of LOS or NLOS communication paths with the HAN devices 174, 176, 178, and 180.

In the depicted embodiment, the first HAN relay device 158 can be considered to be the HAN relay device for a cell of HAN devices within a geographic area. The first HAN relay device 158 can be a relay site (labeled as R structure). The relay site may also be considered a subscriber site since the first HAN relay device 158 may also be an access point that provides Internet connectivity to a client consumption device connected to the first HAN relay device 158 at the relay and subscriber site.

In one embodiment, the aerial reflector device is a relay reflector device 152 used in a point-to-point (PtP) relay configuration. The relay reflector device 152 is positioned at an altitude of about 10 m to 20 Km between two relay sites (terrestrial locations of first HAN relay device and second HAN relay devices) mechanically, aerodynamically or by buoyancy. A 900 MHz command and control link (C2C) (communication path 157*a*, 157*b*) is used to communicate low data rate telemetry, operational status, and position control messages between the relay reflector device 152 and HAN relay devices at the relay sites within range. The location and orientation (Az/El) of the relay reflector device 152 are updated frequently to maintain a specular reflected path (communication path 155*a*, 155*b*) between the two directional relay antennas of the HAN relay devices 158, 160. High data rate communication is established between relay radios/antennas located at relay sites along the NLOS reflected path 155*a*, 155*b*.

In another embodiment, the aerial reflector device is an access reflector device 154 used in a point-to-multi-point (PtMP) access configuration. The access reflector device 154 is positioned at an altitude of about 10 m to 20 Km above each subscription site (locations of HAN devices 164, 166, 168, and 170, mechanically, aerodynamically, or by buoyancy. The reflective surfaces of the access reflector device 154 can be illuminated by the directional access antenna of the first HAN relay device 158 at the relay site in multiple ways. The directional access antenna can illuminate the reflective surfaces of the access reflector device 154 uniformly to provide simultaneous coverage of the entire geographic area 151. In one embodiment, the beam shape of the reflected radiation pattern can be a concentric shape. In another embodiment, the beam shape of the reflected radiation pattern can be adjusted into geographic shapes of coverage area, such as a rectangular shape. The directional access antenna can illuminate the reflective surfaces of the access reflector device 154 non-uniformly to provide partial coverage to different regions of the geographic area 151. In either case, multiple subscriber sites may be present in the coverage area requiring appropriate frequency channel and time slot allocation in order to mitigate interference. The directional access antennas at the subscriber sites are aligned with the reflective surface of the access reflector device 154 within the same geographic area 151. The coverage range of the access reflector device 154 is determined by the height and dimension of the access reflector device 154, and the directional access antenna's beam width and incident angle with respect to the access reflector device 154. Network traffic can be bridged between radio and directional antenna of the HAN relay device at the relay site and the radio and access directional antenna of the respective HAN device at each of the respective subscription site.

The aerial reflector device can include multiple reflector configurations. In one embodiment, each PtP link or PtMP link can be operated in single input, single output (SISO) mode. This means there is a single reflected path between each pair of radios/antennas. In another embodiment, each PtP link or PtMP link can be operated in multiple inputs, multiple outputs (MIMO) mode. This means there are multiple reflected paths between each pair of radios/antennas. Multiple reflected paths may require a constellation of multiple reflectors each of which is aligned to provide a specular reflection between a radio pair.

Additional details of the aerial reflector devices (relay reflector device 152 and access reflector devices 154, 156) are described below with respect to FIGS. 8-18.

Figure 2:
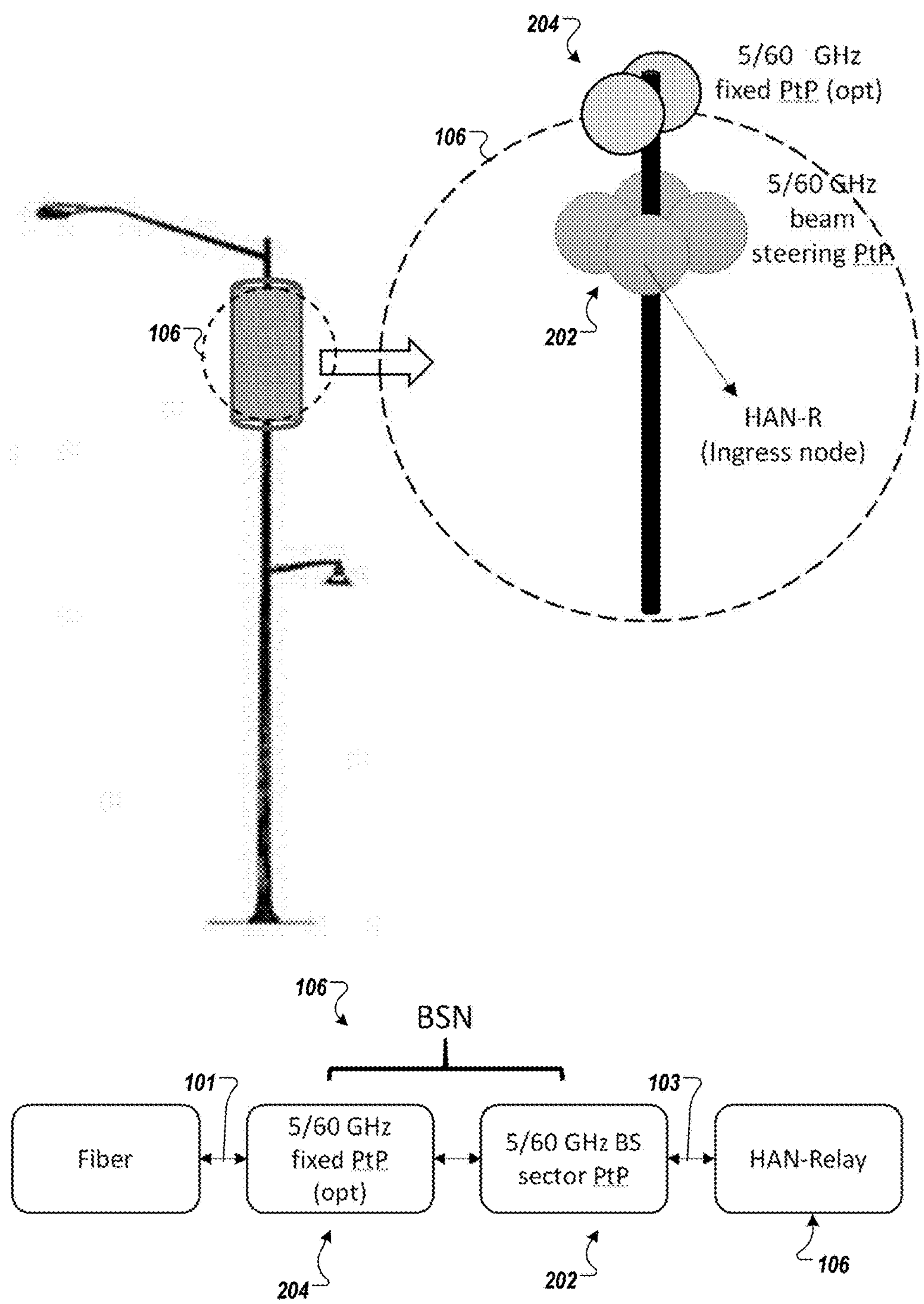
FIG. 2 illustrates a Base Station Node (BSN) device connected to a light pole in a geographic area according to one embodiment.
Figure 8:
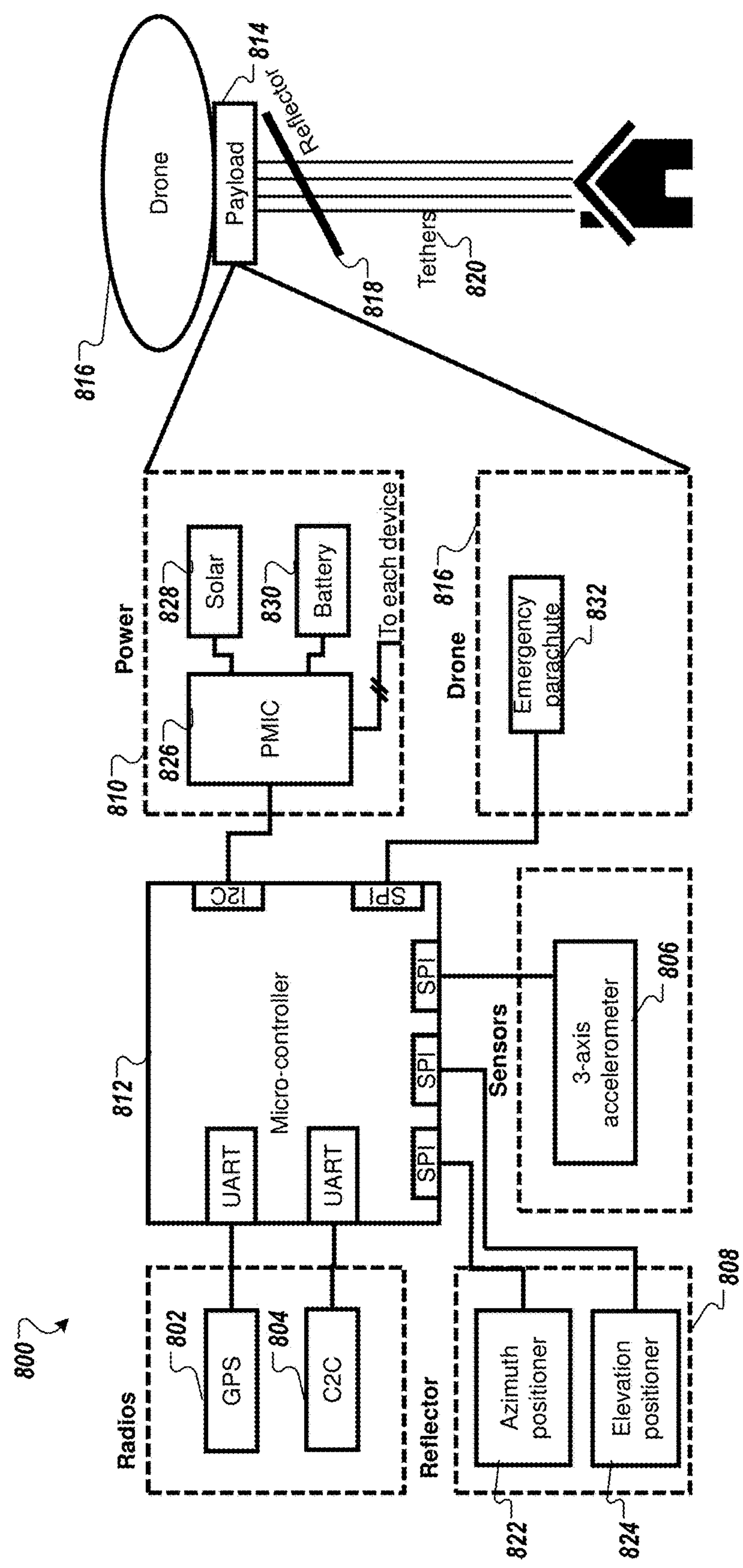
FIG. 8 is a block diagram of an aerial reflector device attached as a payload of a tethered drone according to one embodiment.
Figure 10:
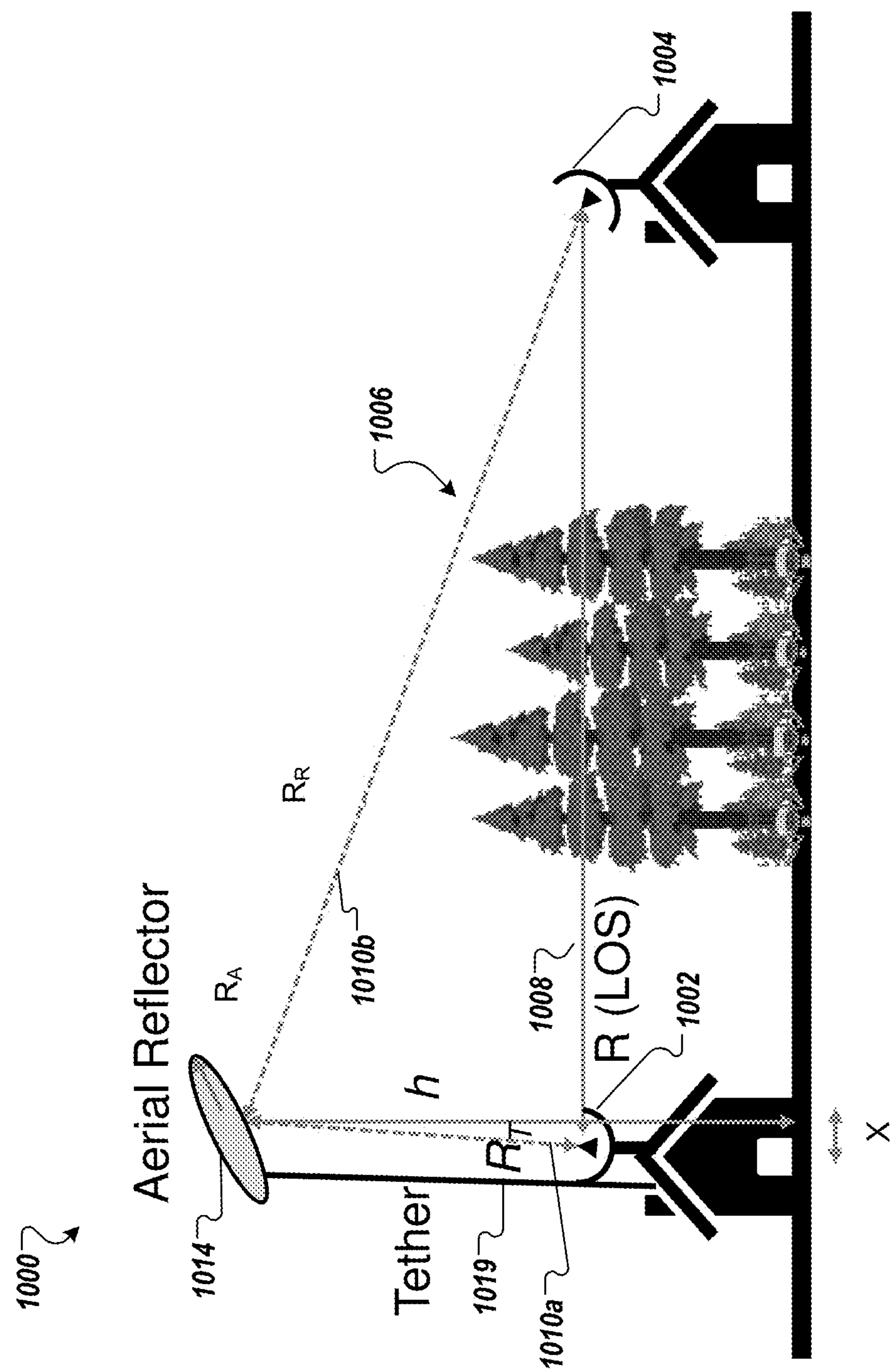
FIG. 10 illustrates a tethered drone with an aerial reflector device used with two HAN relay devices with NLOS in a lateral plane according to one embodiment.

FIG. 2 illustrates a BSN device 106 connected to a light pole in a geographic area according to one embodiment. A coverage area of the BSN device 106 can be split into four quadrants, called sectors, with four sector high-gain antennas 202. These four sector high-gain antennas 202 may be beam-steering antennas to establish PtP wireless connections with other hardware network devices in the WMN. In some embodiments, the four sector high-gain antennas 202 can be high-gain beam steering antennas 202. The BSN device 106, or at least the four sector high-gain antennas 202, can be connected to a tower or other structure. The four sector high-gain antennas 202 can be disposed on a light pole, a lamp post, a tower, or other structure that can put the BSN device 106 at a specified height to reduce the possibility of interfering structures. In some instances, the sector high-gain antennas 202 are referred to as sector antennas since they are disposed to cover sectors of the geographical area, as illustrated in FIGS. 8 and 10, for examples. In one embodiment, the four sector high-gain antennas 202 can be disposed 8 meters off the ground to provide line of sight (LoS) to other hardware network devices in the WMN. One of the four sector high-gain antennas 202 provides data connections to HAN relay devices 102 within its sector using a data stream communicated via the wired connection 101 (fiber or fixed backhaul radios) or the wireless connection 103 or both. Since the four sector high-gain antennas 202 are beam-steering antennas, each of the four sector high-gain antennas 202 can be used to connect to the HAN relay device 102 that can deliver an optimal data connectivity. It should be noted that various embodiments described herein include four sectors. Alternatively, in other embodiments, more or less sectors may be used.

As depicted in FIG. 2, the BSN device 106 uses one of the four sector high-gain antennas 202 to establish a PtP wireless connection 103 with the HAN relay device 102 (as an ingress node). The BSN device 106 can establish PtP wireless connections with other HAN relay devices 102 using the other sector high-gain antennas 202. In another embodiment, the BSN device 106 also includes one or more fixed-beam antennas 204 to establish PtP wireless connections with other network devices. For example, the BSN device 106 can establish a PtP wireless connection with a second BSN device 106 in the WMN 100. The BSN device 106 may not include a wired connection 101 and can communicate with the second BSN device 106 that does have a wired connection. The second BSN device 106 may be a backhaul node with fiber access. The BSN device 106 can communicate with other BSN devices 106 for other purposes. The fixed-beam antennas 204 may be optional for BSN devices that have direct-wired connections to the broadband Internet infrastructure 108. The fixed-beam antennas 204 may permit the BSN device 106 to have large data throughput, such as approximately 1 to 7 Gbps). The fixed-beam antennas 204 can radiate electromagnetic energy at 5 GHz or 60 GHz, depending on the required data rate and the communication distance needed for proper wireless communication between devices. The fixed-beam antennas 204 can be coupled to radios in the BSN device 106 as described in more detail below with respect to FIG. 3. The radios may be bidirectional transceivers that transmit and receive wireless signals via the fixed-beam antennas 204.

Also, as depicted in FIG. 2, the BSN device 106 may include a transceiver to communicate with the broadband Internet infrastructure 108 via a wired connection 101. The wired connection 101 can be an optical fiber connection of greater than 1 Gbps throughput. The optical fiber connection can be through a router. The router may be part of the BSN device 106 or part of another device with which the BSN device 106 communicates.

Figure 3:
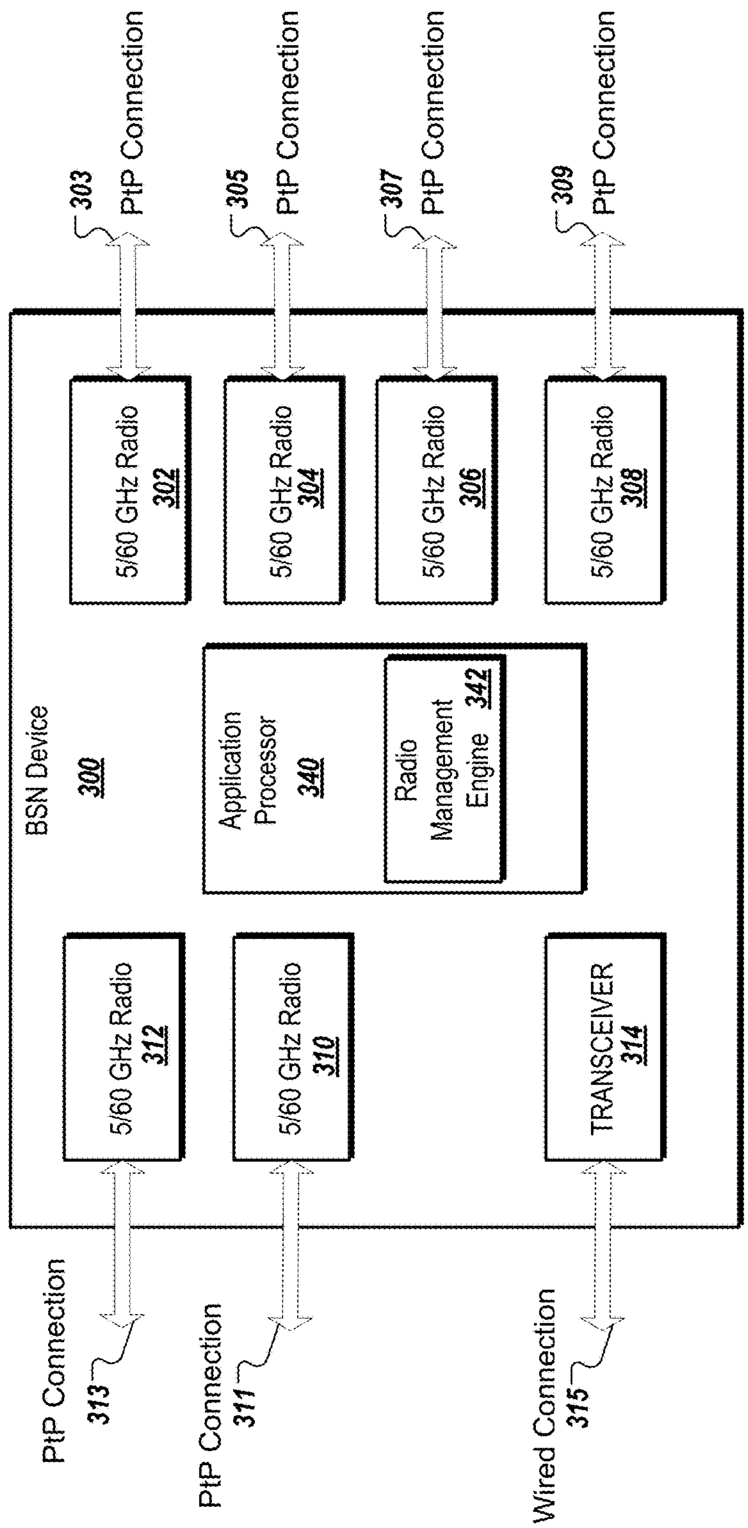
FIG. 3 is a block diagram of a BSN device with multiple radios and an application processor according to one embodiment.

FIG. 3 is a block diagram of a BSN device 300 with multiple radios and an application processor according to one embodiment. It should be noted that the BSN device 300 can be the BSN device 106 described above with respect to FIGS. 1-2. The BSN device 300 includes a first 5/60 GHz radio 302, a second 5/60 GHz radio 304, a third 5/60 GHz radio 306, a fourth 5/60 GHz radio 308, a fifth 5/60 GHz radio 310, a sixth 5/60 GHz radio 312, and a transceiver 314. The first 5/60 GHz radio 302 creates a first PtP wireless connection 303 between the BSN device 300 and a HAN relay device (not illustrated in FIG. 3) in a first sector of the WMN 100. The second 5/60 GHz radio 304 creates a second PtP wireless connection 305 between the BSN device 300 and a HAN relay device (not illustrated) in a second sector of the WMN 100. The third 5/60 GHz radio 306 creates a third PtP wireless connection 307 between the BSN device 300 and a HAN relay device (not illustrated) in a third sector of the WMN 100. The fourth 5/60 GHz radio 308 creates a fourth PtP wireless connection 309 between the BSN device 300 and a HAN relay device (not illustrated) in a fourth sector of the WMN 100. Each of the first, second, third, and fourth 5/60 GHz radios 302-308 is connected to a beam-steering antenna, such as one of the four high-gain sector antennas 202 of FIG. 2. Each of the first, second, third, and fourth 5/60 GHz radios 302-308 provides a data connection to a HAN relay device within its sector using a data stream received from the wired connection 101 or the wireless connection 103. The first, second, third, and fourth 5/60 GHz radios 302-308 can be used to provide backhaul for a first sub-mesh network of HAN relay devices 102, as described herein. It should also be noted that multiple HAN devices can be organized in a second sub-mesh network of HAN devices to provide access to devices within the respective structures to which the HAN devices reside.

The BSN device 300 also includes the fifth 5/60 GHz radio 310 creates a PtP wireless connection 311 between the BSN device 300 and a backhaul node with fiber access, such as another BSN device 106 in the WMN 100. The sixth 5/60 GHz radio 312 creates a PtP wireless connection 313 between the BSN device 300 and another backhaul node with fiber access, such as another BSN device 106. In another embodiment, there may be additional radios used for PtP wireless connections like PtP wireless connections 311, 313. Also, in other embodiments, more or less radios can be used for PtP wireless connections 303-309. Alternatively, different number of 5 GHz radios may be used for more or less PtP wireless connections with other mesh network devices.

The BSN device 300 also includes the transceiver 314 to create a wired connection 315 between the BSN device 300 and one or more devices in the broadband Internet infrastructure 108, such as a router coupled to an optical fiber connection. The transceiver 314 can be used for high-speed data transmission with the broadband Internet infrastructure 108.

In other embodiments, the BSN device 300 may include other radios for other types of wireless communications, such as a cellular radio to communicate using one of the cellular technologies. For example, a network control service can be hosted in the cloud and the cellular connection can be used to communicate control information with the network control service to manage the WMN 100. In other embodiments, as long as there is Internet connectivity in the WMN 100, the control information can be communicated via the Internet connectivity, instead of the cellular connection. The cloud services of the WMN 100 (also referred to as software defined network (SDN)) can include mechanisms to deal with network devices that become unavailable, adding, removing, or modifying existing network devices in the WMN 100. The cloud services may also include mechanisms for remote health and management. For example, there may be a remote health interface, a management interface, or both to access the network devices for this purpose. The cloud services can also include mechanisms for securing the WMN 100 and the content that resides in the WMN 100. For example, the cloud services can control device access, Digital Rights Management (DRM), and node authentication.

The BSN device 300 includes the application processor 340 to process data signals in connection with communicating with other network devices in a WMN. The application processor 340 is coupled to the radios 302-312 and the transceiver 314. In other embodiments, other processing devices may be used. The application processor 340 can execute various modules, such as a radio management engine 342. The radio management engine 342 can be a computer program that may operate as a background process, such as a daemon that is started at boot time and performs the tasks described above with respect to communications using the various radios described herein. The radio management engine 342 can configure hardware, run scheduled tasks, as well as perform the variety of tasks described above to communicate data packets or control packets as described herein. In one embodiment, the radio management engine 342 can communicate with the network control service hosted in the cloud using, for example, the transceiver 314 via the wired connection 315. The processing logic of radio management can be implemented locally in the radio management engine 342 at the application processor 340. Alternatively, some or all of the processing logic of the radio management engine 342 can be performed in a radio management engine hosted in the cloud as part of the network control service. Alternatively, the network control service can implement a radio management engine and the application processor 340 can implement the radio management engine 342 as a distributed system. Alternatively, the radio management engine 342 performs the various operations and reports the status, configuration, or other information to the network control service. In one embodiment, the radio management engine 342 performs the method(s) described herein. Alternatively, the radio management engine 342 can perform other operations as described herein.

In one embodiment, the application processor 340 processes data signals in connection with communicating with other network devices in a WMN, such as the HAN relay device 102. The application processor 340 may be coupled to a first radio that is coupled to a first beam-steering antenna, a second radio that is coupled to a second beam-steering antenna. The application processor 340 communicates data with a second device over the wired connection 315 using the transceiver 314. The application processor 340 also communicates the data with a HAN relay device 102 using the first radio and the first beam-steering antenna over a PtP wireless connection. The application processor 340 can also communicate additional data to a second HAN relay device 102 over another PtP wireless connection using the second radio and the corresponding second beam-steering antenna.

In another embodiment, the BSN device 106 includes a first radio to communicate with a server of a content delivery network (CDN) over at least one of a first wired connection or a PtP wireless connection. The BSN device 106 also includes a set of four 60 GHz radios. Each of the set of four 60 GHz radios is coupled to a beam-steering antenna in one of four sectors of the BSN device 106. Each of the set of four 60 GHz radios establishes a PtP wireless connection over which the BSN device 106 wirelessly communicates with at least some of the HAN relay devices 102 in the geographic area.

In one embodiment, the BSN device 106 is one of multiple ingress nodes of the WMN 100 to provide Internet connectivity to devices within the WMN 100. In another embodiment, the BSN device 106 is the only ingress node of the WMN 100 to provide Internet connectivity to devices within the WMN 100.

Figure 4:
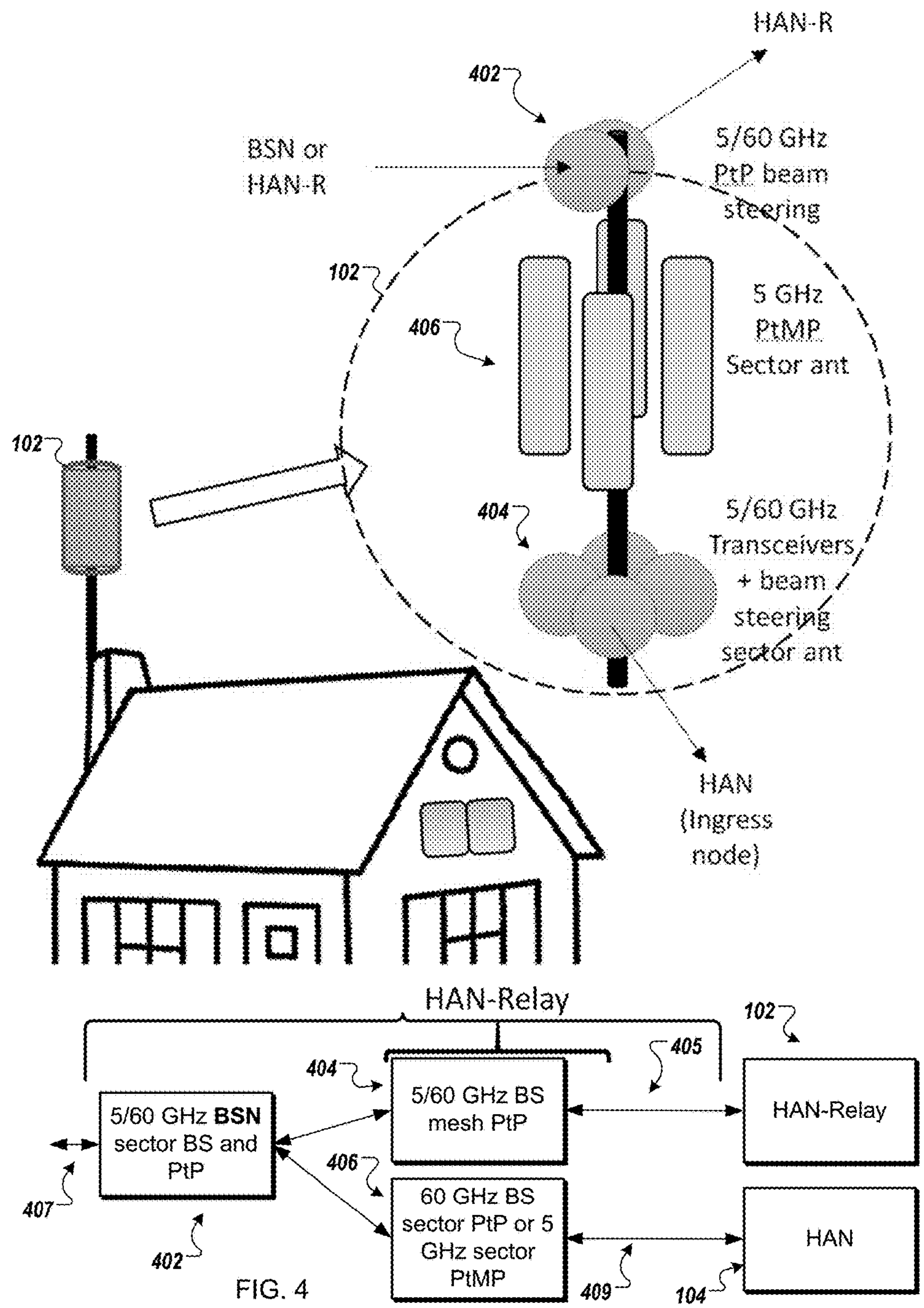
FIG. 4 illustrates a Home Access Node (HAN) relay device connected to a pole on a structure in the geographical area of the BSN according to one embodiment.

FIG. 4 illustrates a HAN relay device 102 connected to a pole on a structure in the geographical area of the BSN 106 according to one embodiment. As described above, the coverage area of the BSN device 106 can be split into four sectors using four sector high-gain antennas 202. Similarly, the HAN relay device 102 can include multiple sector high-gain antennas 402. These sector high-gain antennas 402 may be beam-steering antennas to establish PtP wireless connections with other hardware network devices in the WMN 100, such as the BSN device 106, another HAN relay device 102, or both. Alternatively, these sector high-gain antennas 402 may be sector fixed-beam antennas. In the depicted embodiment, there are two sector high-gain antennas 402, one of which can wirelessly connect to the BSN device 106 and the other of which can wirelessly connect to a second HAN relay device 102. Alternatively, one of the two sector high-gain antennas 402 can wirelessly connect to a second HAN relay device 102 and the other can wirelessly connect to a third HAN relay device 102. One of the two sector high-gain antennas 402 can connect with the BSN device 106 to form an ingress point of a first sub-mesh network of HAN relay devices 102 of the WMN 100. Another one of the two sector high-gain antennas 402 can connect with another HAN relay device 102 to relay data to another HAN relay device 102 that may not be connected to a BSN device 106.

The HAN relay device 102 also includes four beam-steering sector antennas 404 and four beam-steering sector antennas 404 (or optional four fixed-beam sector antennas). In some instances, the four beam-steering sector antennas 404 are referred to as sector antennas since they are disposed to cover sectors of a smaller geographical area surrounding the HAN relay device 102. In one embodiment, the four beam-steering sector antennas 404 can be disposed 4 meters above the structure to provide LoS to other HAN devices 104 in the WMN 100. The sector high-gain antennas 402 can provide connections to other HAN relay devices 102 or BSN devices 106. Each of the HAN devices is individually connected to a building in a geographic area and each of the HAN devices can be an access point to provide Internet connectivity to a client device (e.g., client consumption device) located in a respective building to which the first HAN device is connected. The HAN relay device 102, or at least the antennas 402, 404, 406 of the HAN relay device 102, can be connected to a structure or to a pole connected to the structure. One of the four beam-steering sector antennas 404 provides data connections to HAN devices 104 within its corresponding sector using a data stream communicated via the wireless connections to the BSN device 106 (or with another one of the HAN relay devices 102) as described herein. Since the four beam-steering sector antennas 404 are beam-steering antennas, each of the four beam-steering sector antennas 404 can be used to connect to the HAN devices 104 over PtP wireless connections 409 to deliver data with optimal data connectivity. In one embodiment, the four beam-steering antennas 404 can radiate electromagnetic energy at 5 GHz or at 60 GHz. The four beam-steering antennas 404 can be coupled to corresponding radios in the HAN relay device 102 as described in more detail below with respect to FIG. 5. The radios may be bidirectional transceivers that transmit and receive wireless signals via the corresponding one of the four beam-steering antennas 404.

In another embodiment, the HAN relay device 102 also includes four fixed-beam sector antennas 406 to establish PtMP wireless connections 409 with one or more HAN devices 104. One of the four fixed-beam sector antennas 406 provides data connections to HAN devices 104 within its corresponding sector using a data stream communicated via the wireless connections to the BSN device 106 (or with another one of the HAN relay devices 102). Since the four fixed-beam sector antennas 406 are not beam-steering antennas, the fixed beam sector antennas 406 can be used to establish a PtMP wireless connection with one or more HAN devices 104 in the corresponding sector. The four fixed-beam sector antennas 406 may be optional for HAN relay devices 102. The four fixed-beam sector antennas 406 may permit the HAN relay device 102 to have a backup wireless connection with large data throughput, such as approximately 1 to 7 Gbps. In one embodiment, the four fixed-beam sector antennas 406 can radiate electromagnetic energy at 5 GHz. The four fixed-beam sector antennas 406 can be coupled to corresponding radios in the HAN relay device 102 as described in more detail below with respect to FIG. 5. The radios may be bidirectional transceivers that transmit and receive wireless signals via the corresponding one of the four fixed-beam sector antennas 406.

As depicted in FIG. 4, the HAN relay device 102 uses one of the four beam-steering antennas 404 to establish a PtP wireless connection 405 with the HAN relay device 102 (as an ingress node). The HAN relay device 102 can establish PtP wireless connections 407 with other HAN relay devices 102 or the BSN device 106 using the sector high-gain antennas 402.

Figure 5:
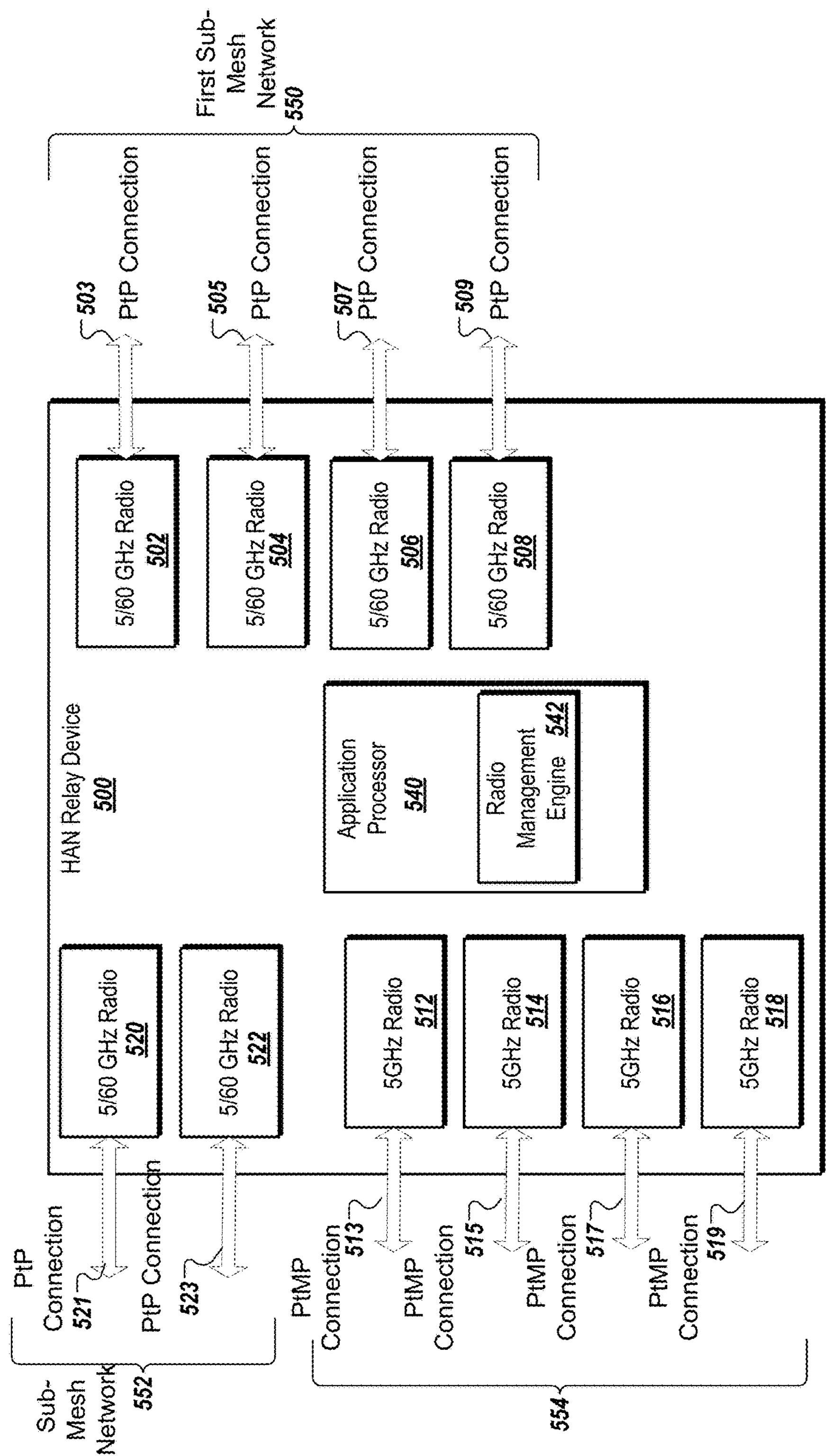
FIG. 5 is a block diagram of a HAN relay device with multiple radios and an application processor according to one embodiment.

FIG. 5 is a block diagram of the HAN relay device 500 with multiple radios and an application processor according to one embodiment. It should be noted that the HAN relay device 500 can be the HAN relay device 102 described above with respect to FIGS. 1-4. The HAN relay device 500 includes a first 5/60 GHz radio 502, a second 5/60 GHz radio 504, a third 5/60 GHz radio 506, a fourth 5/60 GHz radio 508, a fifth 5/60 GHz radio 510, and a sixth 5/60 GHz radio. The first 5/60 GHz radio 502 creates a first PtP wireless connection 503 between the HAN relay device 500 and a HAN device 104 (not illustrated in FIG. 5) in a first sector of the HAN relay device 500. The second 5/60 GHz radio 504 creates a second PtP wireless connection 505 between the HAN relay device 500 and a HAN device 104 (not illustrated) in a second sector of the HAN relay device 500. The third 5/60 GHz radio 506 creates a third PtP wireless connection 507 between the HAN relay device 500 and a HAN device 104 (not illustrated) in a third sector of the HAN relay device 500. The fourth 5/60 GHz radio 508 creates a fourth PtP wireless connection 509 between the HAN relay device 500 and a HAN device 104 (not illustrated) in a fourth sector of the HAN relay device 500. Each of the first, second, third, and fourth 5/60 GHz radios 502-508 is connected to a beam-steering antenna, such as one of the four beam-steering antennas 404 of FIG. 4. Each of the first, second, third, and fourth 5/60 GHz radios 502-508 provides a data connection to a HAN device 104 within its sector using a data stream received from the BSN device 106 (or from another HAN relay device 102). The first, second, third, and fourth 5/60 GHz radios 502-508 can be used to provide a sub-mesh network 550 of HAN devices 104 to provide access to devices within the respective structures to which the HAN devices 104 reside, as described herein. It should also be noted that multiple HAN relay devices 102 can be organized in a sub-mesh network 552 of HAN relay devices to provide backhaul to HAN devices 104 within the sub-mesh network 550.

The HAN relay device 500 also includes a ninth 5/60 GHz radio 520 and a tenth 5/60 GHz radio 522. The ninth 5/60 GHz radio 520 creates a PtP wireless connection 521 between the HAN relay device 500 and either a BSN device 106 or another HAN relay device 102 in the WMN 100. The tenth 5/60 GHz radio 5222 creates a PtP wireless connection 523 between the HAN relay device 500 and either a BSN device 106 or another HAN relay device 102 in the WMN 100. The ninth 5/60 GHz radio 520 and tenth 5/60 GHz radio 522 can be used to provide the sub-mesh network 552 of HAN devices 104 to provide backhaul to the HAN devices 104 within the sub-mesh network 550. In another embodiment, there may be additional radios used for PtP wireless connections to other HAN relay devices 102 or BSN devices 106, like PtP wireless connections 521, 523. Also, in other embodiments, more or less radios can be used for PtP wireless connections 503-509.

The HAN relay device 500 also includes a fifth 5 GHz radio 512, a sixth 5 GHz radio 514, a seventh 5 GHz radio 516, an eighth 5 GHz radio 518. The fifth 5 GHz radio 512 creates a first PtMP wireless connection 513 between the HAN relay device 500 and one or more of the HAN devices 104 (not illustrated in FIG. 5) in the first sector of the HAN relay device 500. The second 5 GHz radio 514 creates a second PtMP wireless connection 515 between the HAN relay device 500 and one or more of the HAN devices 104 (not illustrated in FIG. 5) in the second sector of the HAN relay device 500. The third 5 GHz radio 516 creates a third PtMP wireless connection 517 between the HAN relay device 500 and one or more of the HAN devices 104 (not illustrated in FIG. 5) in the third sector of the HAN relay device 500. The fourth 5 GHz radio 518 creates a fourth PtMP wireless connection 519 between the HAN relay device 500 and one or more of the HAN devices 104 (not illustrated in FIG. 5) in the fourth sector of the HAN relay device 500. Each of the first, second, third, and fourth 5 GHz radio 512-518 is connected to a fixed-beam antenna, such as one of the four fixed-beam antennas 406 of FIG. 4. Each of the first, second, third, and fourth 5 GHz radio 512-518 provides a data connection to a HAN device 104 within its sector using a data stream received from the BSN device 106 (or from another HAN relay device 102). The first, second, third, and fourth 5 GHz radios 512-518 can be used to provide backup wireless connections 554 to the wireless connections 503-509 of the sub-mesh network 550, as described herein.

In other embodiments, the HAN relay device 500 may include other radios for other types of wireless communications, such as a cellular radio to communicate using one of the cellular technologies. The cellular connection may be used to communicate with the network control service to manage the WMN 100 as described herein.

The HAN relay device 500 includes the application processor 540 to process data signals in connection with communicating with other network devices in a WMN. The application processor 540 is coupled to the radios 502-508, radios 512-518, and radios 520-522. In other embodiments, other processing devices may be used. The application processor 540 can execute various modules, such as a radio management engine 542 that is similar in operations of the radio management engine 342 described above with respect to FIG. 3.

In one embodiment, the application processor 540 processes data signals in connection with communicating with other network devices in a WMN, such as the HAN device 104. The application processor 540 may be coupled to a first radio (e.g., 520) that is coupled to a first beam-steering antenna, a second radio (e.g., 502) that is coupled to a second beam-steering antenna. The application processor 540 communicates data with the BSN device 106 (or another HAN relay device 102) over the PtP wireless connection 521 using the first radio 520 and communicate data with the HAN device 104 over the PtP wireless connection 503 using the second radio 502. The application processor 340 can also communicate additional data to a second HAN device 102 over another PtP wireless connection 505 using a third radio 504 and the corresponding beam-steering antenna.

In another embodiment, the HAN relay device 500 includes a first set of two 5/60 GHz radios. Each of the first set of two 5/60 GHz radios is coupled to a beam-steering antenna. Each of the first set of two 5/60 GHz radios establishes a PtP wireless connection over which the HAN relay device 500 communicates with a second HAN relay device in a first sub-mesh network of HAN relay devices in the WMN (referred to as HAN-R sub-mesh network). Alternatively, each of the first set of two 5/60 GHz radios establishes a PtP wireless connection with a BSN device. The HAN relay device 500 also includes a second set of four 5/60 GHz radios. Each of the second set of four 5/60 GHz radios is coupled to a beam-steering antenna in one of the four sectors. Each of the second set of four 5/60 GHz radios establishes a PtP wireless connection over which the HAN relay device 500 communicates with one of the HAN devices 104 in a second sub-mesh network in the WMN 100 (referred to as HAN sub-mesh network).

In a further embodiment, the HAN relay device 500 further includes a third set of four 5 GHz radios. Each of the third set of four 5 GHz radios is coupled to an antenna in one of the four sectors. Each of the third set of four 5 GHz radios establishes a PtMP wireless connection over which the HAN relay device 500 communicates with at least some of the HAN devices 104 in the second sub-mesh network of HAN devices in the WMN 100. The PtMP wireless connection may be a backup communication link for the PtP wireless connection.

In one embodiment, the radios 502-508 may be 60 GHz transceivers used to communicate with HAN devices 104 within corresponding sectors to initiate the second sub-mesh network of HAN devices. The radios 512-518 may be 5 GHz transceivers used to communicate with HAN devices within corresponding sectors to form PtMP sectors communication as back-up communication links for the second sub-mesh network (i.e., the 60 GHz mesh network).

In another embodiment, the BSN device 106 and BSN device 300 described above can also include the technology of the HAN relay device 102 and HAN relay device 500 described above to operate as a BSN/HAN relay device. In these embodiments, additional radios and antennas may be included in the same device. In another embodiment, the BSN device 106 can be located on a same structure as a HAN relay device 102. In such cases, the BSN device 106 (300) and the HAN relay device 102 (500) would include a transceiver to establish a wired connection between the two devices.

Figure 6:
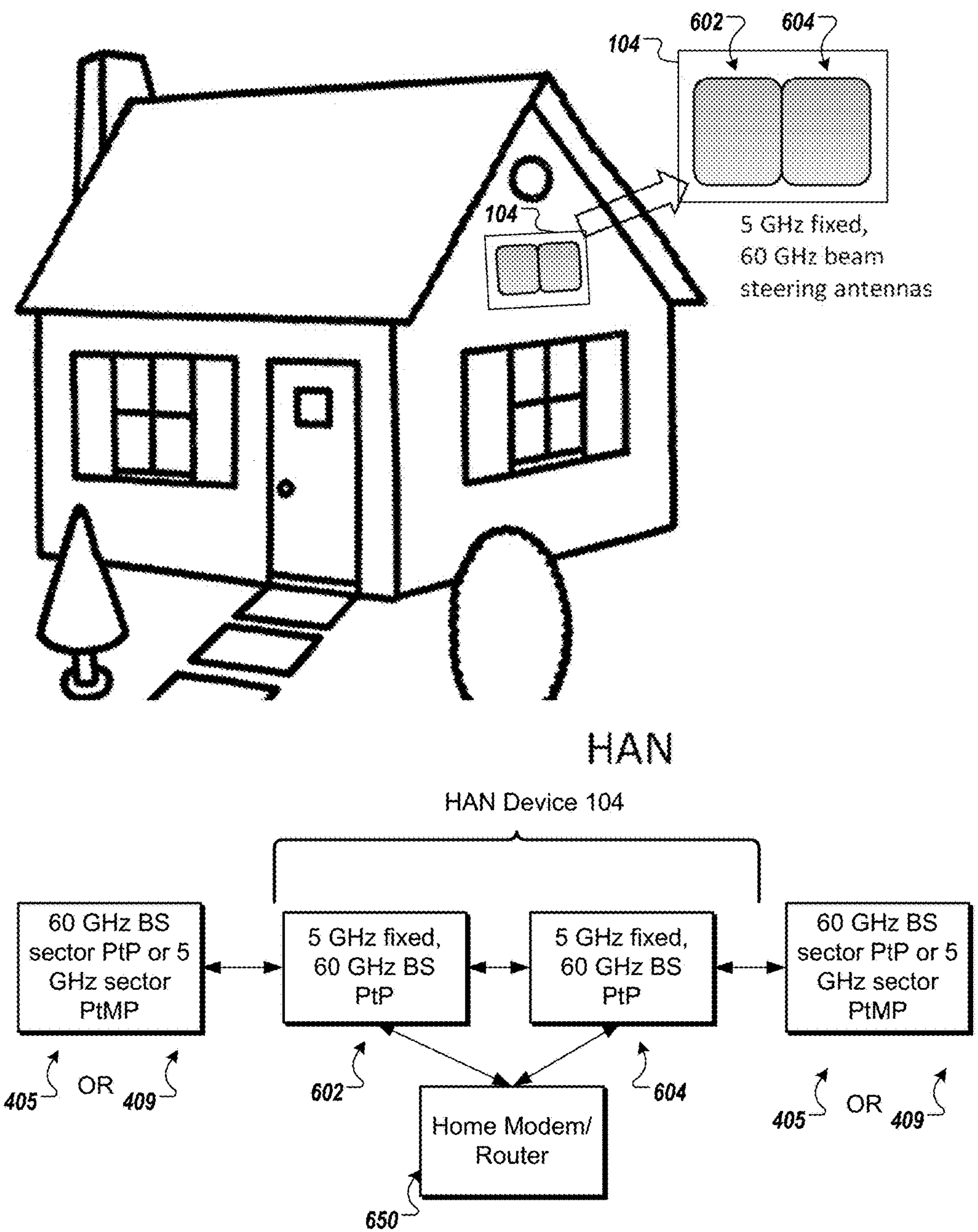
FIG. 6 illustrates a HAN device connected to an exterior of a structure in the geographical area of the BSN according to one embodiment.

FIG. 6 illustrates a HAN device 104 connected to an exterior of a structure in the geographical area of the BSN 106 according to one embodiment. As described above, the coverage area of the BSN device 106 can be split into four sectors using four sector high-gain antennas 202. Similarly, the HAN relay device 102 can be split into four sectors using four beam-steering antennas 404. In some instances, the four beam-steering sector antennas 404 are referred to as sector antennas since they are disposed to radiate electromagnetic energy to cover sectors of a smaller geographical area surrounding the HAN relay device 102. The HAN relay device 102 can also include the four fixed-beam antennas 406. The HAN device 104 includes two radios 602, 604, and each of the two radios is connected to both a 5 GHz fixed-beam antenna and a 60 GHz beam-steering antenna. In one embodiment, the 5 GHz fixed-beam antenna and the 60 GHz beam-steering antenna can be disposed on an exterior of a structure. The structure does not have to be the same structure upon which the HAN relay device 102 is disposed. The radio 602 can provide a data connection to one of the HAN relay devices 102 and the radio 604 can provide a data connection to another HAN device 104. Alternatively, the radio 604 can provide a data connection to one of the HAN relay devices 102 and the radio 602 can provide a data connection to another HAN device 104. These data connections can be via the beam-steering antennas or the fixed-beam antennas. The beam-steering antennas 404 can be used to connect to the HAN device 104 to the HAN relay device 102 to communicate data with optimal data connectivity. In one embodiment, the beam-steering antenna can radiate electromagnetic energy at 60 GHz. Alternatively, the beam-steering antenna can radiate electromagnetic energy at 5 GHz. The HAN device 104 can also have a wired connection or wireless connection to a device within the structure, such as a home modem/router 650. The radios 602, 604 may each be a bidirectional transceiver that transmit and receive wireless signals via the beam-steering antenna or the fixed-beam antenna.

The HAN device 104 can communicate with the HAN relay device 102 to form a mesh network using a beam-steering antenna and can provide Internet to a subscriber as an access point for the home modem/router 650.

Figure 7:
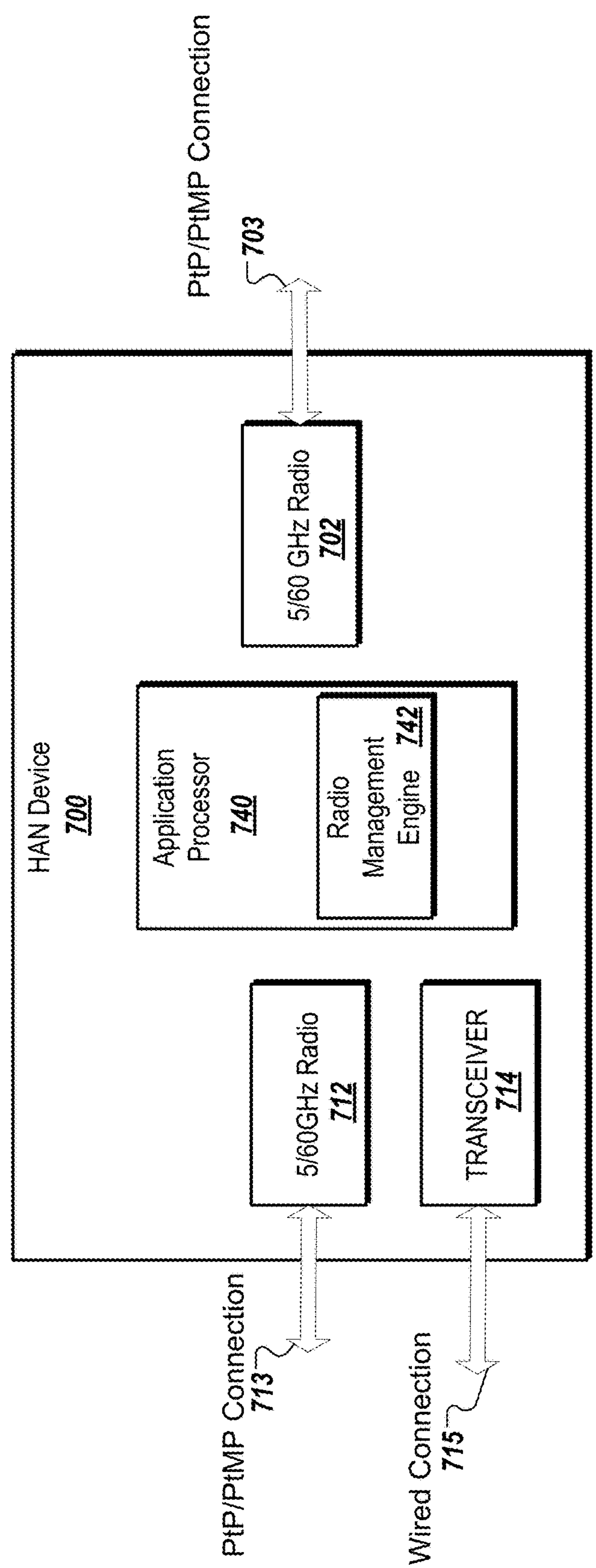
FIG. 7 is a block diagram of a HAN device with multiple radios and an application processor according to one embodiment.

FIG. 7 is a block diagram of a HAN device 700 with multiple radios and an application processor according to one embodiment. It should be noted that the HAN device 700 can be the HAN device 104 described above with respect to FIGS. 1-6. The HAN device 700 includes a 5/60 GHz radio 702 and a 5/60 GHz radio 712. The 5/60 GHz radio 702 creates a PtP or PtMP wireless connection 703 between the HAN device 700 and a HAN relay device 102 (not illustrated in FIG. 7). The 5/60 GHz radio 702 may be connected to a beam-steering antenna or a fixed-beam antenna as described herein. The 5/60 GHz radio 712 creates a PtP or PtMP wireless connection 713 between the HAN device 700 and a HAN device 104 (not illustrated in FIG. 7). Alternatively, the 5/60 GHz radio 712 creates a PtP or PtMP wireless connection 713 between the HAN device 700 and a HAN relay device 102 and the 5/60 GHz radio 702 creates a PtP or PtMP wireless connection 713 between the HAN device 700 and a HAN device 104 (not illustrated in FIG. 7). The HAN device 700 may be in any one of the four sectors of the HAN relay device. The 5/60 GHz radio 712 may be connected to a beam-steering antenna or a fixed-beam antenna. The HAN device 700 may be an access point to provide Internet connectivity to one or more client consumption devices located in or near a first building to which the HAN device 700 is connected. The HAN device 700 may include a transceiver 714 to create a wired connection 715 between the HAN device 700 and a device (home modem/router 650) located within the structure upon which the HAN device 700 is disposed. The wired connection 715 may be any type of wired connection. Alternatively, other connections can be made between the HAN device 700 and the home modem/router 650, such as an optical connection, a WLAN connection, a PAN connection, or the like. Alternatively, the HAN device 700 may include routing capability to distribute content to devices located within or near the structure upon which the HAN device 700 is disposed.

In another embodiment, there may be additional radios used for PtP wireless connections or PtP wireless connection. Also, in other embodiments, more or less radios can be used for PtP wireless connections and PtMP wireless connection. In other embodiments, the HAN device 700 may include other radios for other types of wireless communications, such as a cellular radio to communicate using one of the cellular technologies. The cellular connection may be used to communicate with the network control service to manage the WMN 100 as described herein.

The HAN device 700 includes the application processor 740 to process data signals in connection with communicating with other network devices in a WMN. The application processor 740 is coupled to the 60 GHz radio 702 and the 5 GHz radio 712. In other embodiments, other processing devices may be used. The application processor 540 can execute various modules, such as a radio management engine 742 that is similar in operations of the radio management engine 342 described above with respect to FIG. 3.

In one embodiment, the application processor 740 processes data signals in connection with communicating with other network devices in a WMN, such as the HAN relay device 102. The application processor 740 may be coupled to a first radio 702 (e.g., 5/60 GHz) that is coupled to a beam-steering antenna or a fixed-beam antenna and a second radio 712 (e.g., 5/60 GHz) that is coupled to a beam-steering antenna or a fixed-beam antenna. The application processor 740 communicates data with the HAN relay device 102 over the PtP or PtMP wireless connection 703 using the first radio 702 and communicates data with a HAN relay device 102 over the PtP PtMP wireless connection 713 using the second radio 712. In another embodiment, the application processor 740 communicates data with the HAN relay device 102 over the PtP or PtMP wireless connection 713 using the second radio 712 and communicates data with a HAN relay device 104 over the PtP PtMP wireless connection 703 using the first radio 702.

In one embodiment, the first radio 702 may be a 60 GHz transceiver used to communicate with HAN relay device 102 on the second sub-mesh network. The second radio 712 may be a 5 GHz transceiver used to communicate with HAN relay device 102 on the backup communication link for the second sub-mesh network (i.e., the 60 GHz mesh network).

As described above with respect to FIG. 1B, an aerial reflector device is capable of being positioned in an aerial location above a HAN relay device at a first terrestrial location and a HAN relay device at second terrestrial location to provide terrestrial NLOS communications between respective radios of the HAN relay devices. The aerial reflector device is positioned in the aerial location using at least one of mechanical mechanism, an aero-dynamical mechanism, or a buoyancy mechanism, such as described and illustrated with respect to FIGS. 8-18.

FIG. 8 is a block diagram of an aerial reflector device 800 attached as a payload 814 of a tethered drone 816 according to one embodiment. The aerial reflector device 800 includes a reflector 818 that includes a reflective surface and one or more electromechanical components (or electrical components) that can be controlled to adjust a location, an orientation, or both of the reflective surface to provide the terrestrial NLOS communication path as described herein. The aerial reflector device 800 also includes electronics disposed in the payload 814 of the tethered drone 816. The tethered drone 816 includes an aircraft (various types illustrated in FIGS. 9A-9C) with the payload 814 and one or more tethers 820 secured to a structure or ground at a terrestrial location.

As illustrated in FIG. 8, the electronics of the aerial reflector device 800 may include a global positioning system (GPS) radio 802 (or other type of global navigation satellite system (GNSS) radio), a radio 804 (labeled C2C), a three-axis accelerometer 806, a positioning subsystem 808, a power supply subsystem 810, and a micro-controller 812. The GPS radio 802 generates current location of the aerial reflector device using timing signals transmitted along a line of sight from satellites and the C2C radio 804 communicates control data over a point-to-point (PtP) command and control (C2C) link with a radio of the first HAN relay device (e.g., 158 of FIG. 1B), a radio of the second HAN relay device (e.g., 160 of FIG. 1B), or both. The C2C radio 804 may be coupled to an omnidirectional antenna that operates in an unlicensed band. This radio is used for smaller amounts of data using narrowband protocols, as compared to the high gain antennas used by the HAN relay devices to communication data payloads between the devices. The current location of the aerial reflector device may include longitude, latitude, and altitude/elevation. In other embodiments, the current location can be expressed in other forms of positional information. The three-axis accelerometer 806 generates acceleration data. The positioning subsystem 808 is coupled to the reflective surface of the reflector 818 and is configured to electromechanically control the location and the orientation of the reflective surface. In other embodiments, the positioning subsystem 808 may include components to electrically control the location and the orientation of the reflective surface. For example, the reflective characteristics of the reflective surface can be adjusted adjustable circuits or circuit components, such as adjustable capacitors or adjustable inductors. For another example, the components may be MEMs components that are electrically controlled to control the adjustable surface. The power supply subsystem 810 supplies power to components of the aerial reflector device 800. In the depicted embodiment, the power supply subsystem 810 includes a power management integrated circuit (PMIC) 826, a solar system 828, and a battery 830. The PMIC 826 manages power requirements of the micro-controller 812, as well as other components of the aerial reflector device 800. The battery 830 can store power for the aerial reflector device 800. The battery 830 can be rechargeable. In another embodiment, the power supply subsystem 810 can include a power connection through the tethers 820. Power can be supplied to the aerial reflector device 800 through this connection, in place of or in addition to the battery 830, solar system 828, or both. The micro-controller 812 is coupled to the GPS radio 802 via a first interface (e.g., a UART interface) and the C2C radio 804 via a second interface (e.g., a UART interface). The micro-controller 812 is coupled to the three-axis accelerometer 806 via a third interface (e.g., a serial peripheral interface (SPI)). The micro-controller 812 is coupled to the power supply subsystem over a fourth interface (e.g., I2C). The micro-controller 812 is coupled to the positioning subsystem 808 via a fifth interface (e.g., one or more SPI interfaces). The micro-controller 812 may also include an interface to communicate with one or more components of the tethered drone 816, such as an emergency parachute system 832. This interface may be a SPI. Although certain types of interfaces are illustrated, other types of interfaces may be used between components.

In one embodiment, the positioning subsystem 808 includes an azimuth positioner 822 and an elevation positioner 824. The azimuth positioner 822 is configured to adjust an azimuth angle of the reflective surface of the reflector 818. The elevation positioner 824 is configured to adjust an elevation of the reflective surface of the reflector 818. The micro-controller 812 is further configured to communicate the one or more control signals to the tethered drone 816, the azimuth positioner 822, the elevation positioner 824, or any combination thereof.

During operation, in one embodiment, the micro-controller 812 receives control data from the C2C radio 804. The control data includes a specified location and a specified orientation of the aerial reflector device 800 such that the reflective surface provides the terrestrial NLOS communication path between a first radio of a first HAN relay device and a first radio of a second HAN relay device. The micro-controller 812 receives the current location of the aerial reflector device 800 from the GPS radio 802 and the acceleration data from the three-axis accelerometer 806 to determine a current location and a current orientation of the aerial reflector device 800. The micro-controller 812 communicates one or more control signals to the positioning subsystem 808, in view of the current location and the current orientation, to maintain the aerial reflector device 800 in the specified location and the specified orientation.

The tethered drone 816 is one type of aero-dynamical mechanism that can be used to position and orient the aerial reflector device 800. The one or more tethers 820 are coupled to the tethered drone 816 at a first end of the tethers 820 and coupled to a fixed object at a second end of the tethers 820. The fixed object is secured to the ground or a structure on the ground. The tethered drone 816 can be tethered to an installation site for safety, stability, and simplicity and can even be powered through the tethers 820. The tethered drone 816 may be at least one of a buoyant or aerodynamic object with or without propulsion. The propulsion may be a single-axis thruster or a multi-axis thruster. Various types of tethered drones may be used, such as those illustrated and described with respect to FIGS. 9A-9C.

Figures 9A, 9B, 9C:
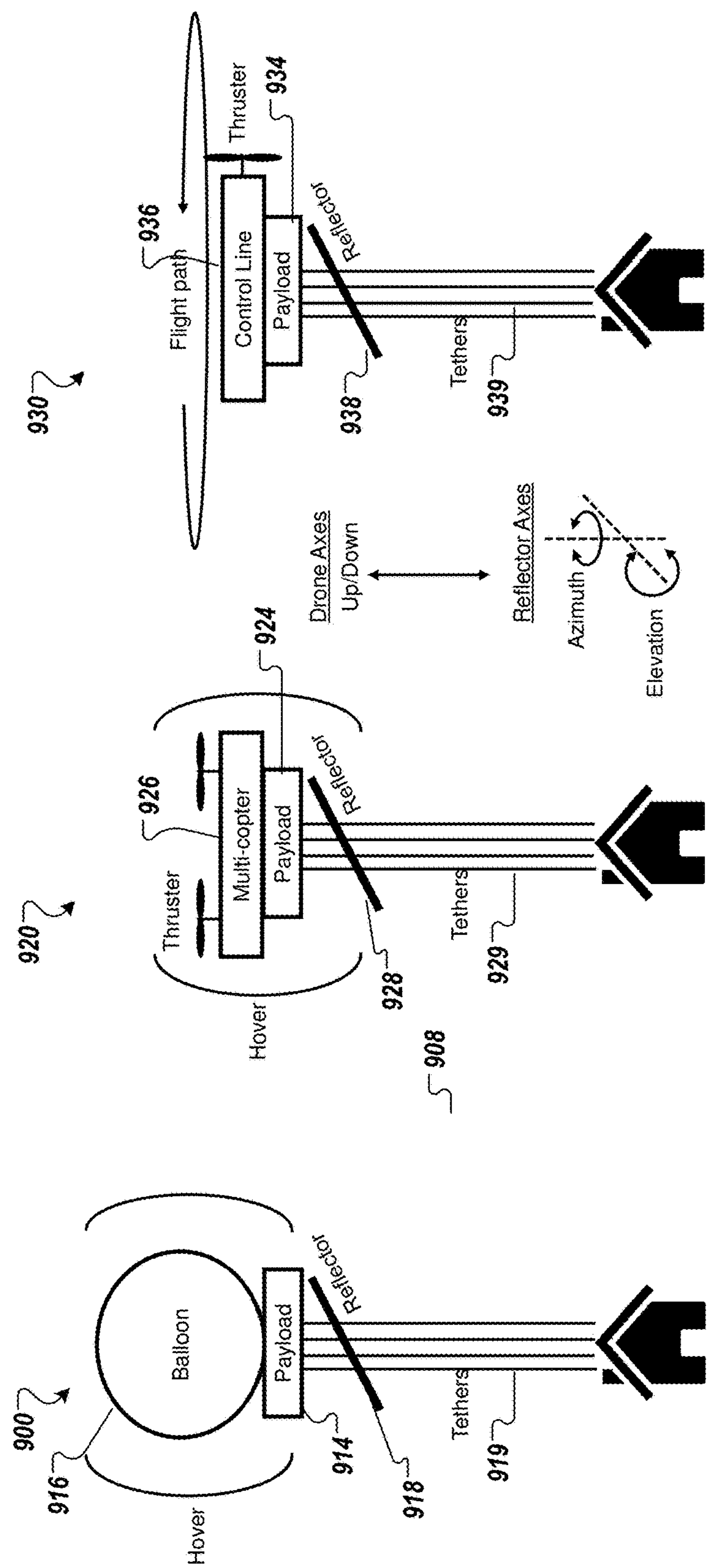
FIG. 9A is an aerial reflector device on a first type of tethered drone according to one embodiment.
FIG. 9B is an aerial reflector device on a second type of tethered drone according to one embodiment.
FIG. 9C is an aerial reflector device on a third type of tethered drone according to one embodiment.

FIG. 9A is an aerial reflector device on a first type of tethered drone 900 according to one embodiment. The first type of tethered drone 900 includes a balloon aircraft 916 having a payload 914 to which a reflector 918 is secured. The tethered drone 900 is secured to an installation site with one or more tethers 919. The electronics of the aerial reflector device are attached as the payload 914 of the balloon aircraft 916. The balloon aircraft 916 hovers above the installation site using buoyancy of the balloon aircraft 916. The first type of tethered drone 900 can be tethered to an installation site via tethers 919 for safety, stability, and simplicity and can even be powered through the tethers 919.

FIG. 9B is an aerial reflector device on a second type of tethered drone 920 according to one embodiment. The second type of tethered drone 920 includes a multi-copter aircraft 926 have a payload 924 to which a reflector 928 is secured. The tethered drone 920 is secured to an installation site with one or more tethers 929. The electronics of the aerial reflector device are attached as the payload 924 of the multi-copter aircraft 926. The multi-copter aircraft 926 hovers above the installation site using multiple thrusters. The second type of tethered drone 920 can be tethered to an installation site via tethers 929 for safety, stability, and simplicity and can even be powered through the tethers 929.

FIG. 9C is an aerial reflector device on a third type of tethered drone 930 according to one embodiment. The third type of tethered drone 930 includes a single-copter aircraft 936 (labeled control line aircraft) have a payload 934 to which a reflector 938 is secured. The tethered drone 930 is secured to an installation site with one or more tethers 939. The electronics of the aerial reflector device are attached as the payload 934 of the single-copter aircraft 936. The single-copter aircraft 936 does not necessarily hover above the installation site, but uses the thruster to fly the single-copter aircraft 936 along a flight path above the installation site. The third type of tethered drone 930 can be tethered to an installation site via tethers 939 for safety, stability, and simplicity and can even be powered through the tethers 939.

In other embodiments, the tethered drone may be other types of balloon aircrafts, single-rotor helicopters, dual-rotor helicopters, multirotor aircrafts (e.g., tricopter, quadcopter, hexacopter, or octocopter), or the like.

FIG. 10 illustrates a tethered drone 1000 with an aerial reflector device 1014 used with two HAN relay devices 1002, 1004 with NLOS in a lateral plane according to one embodiment. As illustrated, an obstruction 1006 prevents a LOS communication path 1008 in the lateral plane between directional antennas of the two HAN relay devices 1002, 1004. The aerial reflector device 1014 provides a NLOS communication path 1010 (segment 1010*a* and 1010*b*) between directional antennas of the two HAN relay devices 1002, 1004. That is a radio of the first HAN relay device 1002 radiates electromagnetic energy via a directional antenna towards a reflective surface of the aerial reflector device 1014 over the segment 1010*a*. The reflective surface reflects the electromagnetic energy as reflective electromagnetic energy towards a directional antenna of the second HAN relay device 1004 over the segment 1010*b*.

In this embodiment, the aerial reflector device 1014 is secured to an installation site of the first HAN relay device 1002 by a tether 1019. The tether 1019 and the drone of the tethered drone 1000 are used to position the aerial reflector device 1014 is a specific location to provide the NLOS communication path 1010.

The following describes the relay analysis of the aerial reflector device 1014. The relay analysis assumes that the aerial reflector device 1014 is many wavelengths in maximum dimension physical optics. The equation of Radar Scattering cross-section (RCS) of the aerial reflector device 1014 is expressed in the following equation:

$$\sigma = \frac{P_R}{P_T}\frac{(4\pi)^3 R_T^2 R_R^2}{\lambda^2}\frac{1}{G_T G_R}$$

Table 1 provides the list of parameters and corresponding definitions:

TABLE 1

| Parameter | Definition |
| --- | --- |
| $P_R$ | Minimum received power based on bandwidth, noise figure, minimum signal to noise radio (SNR) |

TABLE 1-continued

| Parameter | Definition |
|---|---|
| $P_T$ | Maximum transmit power |
| $G_R$ | Receive antenna gain |
| $G_T$ | Transmit antenna gain |
| $R_R$ | Range from receiver to aerial reflector device |
| $R_T$ | Range from transmitter to aerial reflector device |
| σ | Radar Scattering cross-section (RCS) of aerial reflector device |
| λ | Free space wavelength of carrier frequency |

The RCS of the aerial reflector device 1014 represents the size of the spherical object resulting in the same reflected signal level in the scattered direction. RCS can be much smaller or larger than the physical size of the reflective surface. RCS typically depends on frequency, geometry, and material properties. In one embodiment, the physical size (area) of a plate for the reflective surface can be estimated in the following equation:

$$A_P = \lambda\sqrt{\frac{\sigma}{4\pi}}$$

In other embodiments, the reflective surface can be curved, such as in a concave shape or a dish shape to direct and potentially focus the reflective beam. Alternatively, the reflective surface can be passive material or active material, such as MEMs devices that can operate as an array of mirrors that can be individually controlled to direct and focus the reflected radiation pattern.

In one embodiment, the tethered drone 1000 operates at 73 GHz and can be a compact, light, lower power, and stable design. The design can be compact with a 0.5 balloon aircraft and a 0.2 m reflective surface. The design can be light with 0.5 pounds (lbs.) payload or less. The design can be lower power and operate with 1 Watt or less. The design can be stable with a multi-tether system. This may be similar to stunt kites. Table 2 provides the list of parameters, units, LOS, NLOS, and description of each of the parameters:

TABLE 2

| Parameter | Units | LOS | NLOS | Description |
|---|---|---|---|---|
| # Trees | — | 4 | — | Number of tress in LOS path |
| Loss/Tree | dB | 15.0 | — | Average dB of loss per tree @ $f_c$ (carrier frequency) |
| Rain Fade | dB | 20.0 | 20.0 | Assumed dB of rain fade |
| $R_a$ | m | — | 0.10 | Radius of aerial reflector |
| R (LOS) Fade | m | 1000.0 | 1000.0 | Line of sight range |
| h | m | — | 30.0 | altitude of aerial reflector |
| x | m | — | 0.0 | horizontal distance from TX site to aerial reflector |
| $R_r$ | m | — | 1000.4 | lines of sight range from RX to aerial reflector |
| $R_t$ | m | — | 30.0 | line of sign from TX to aerial reflector |
| RCS | dBsm | — | 28.7 | radar cross section of aerial reflector |
| Loss | dB | 209.7 | 161.6 | Total Path Loss |
| NLOS Margin | dB | 48.1 | | Difference between NLOS − LOS losses |

In another embodiment, the tethered drone 100 operates at 5.8 GHz and Table 3 provides the list of parameters, units, LOS, NLOS, and description of each of the parameters:

TABLE 3

| Parameter | Units | LOS | NLOS | Description |
|---|---|---|---|---|
| # Trees | — | 4 | — | Number of tress in LOS path |
| Loss/Tree | dB | 8.0 | — | Average dB of loss per tree @ $f_c$ (carrier frequency) |
| Rain Fade | dB | 0.0 | 0.0 | Assumed dB of rain fade |
| $R_a$ | m | — | 0.25 | Radius of aerial reflector |
| R (LOS) Fade | m | 1000.0 | 1000.0 | Line of sight range |
| h | m | — | 30.0 | altitude of aerial reflector |
| x | m | — | 0.0 | horizontal distance from TX site to aerial reflector |
| $R_r$ | m | — | 1000.4 | lines of sight range from RX to aerial reflector |
| $R_t$ | m | — | 30.0 | line of sign from TX to aerial reflector |
| RCS | dBsm | — | 22.6 | radar cross section of aerial reflector |
| Loss | dB | 139.7 | 125.7 | Total Path Loss |
| NLOS Margin | dB | 14.0 | | Difference between NLOS − LOS losses |

Various embodiments described above are directed to tethered drones. The aerial reflector devices can also be payloads of untethered drones as described below with respect to FIGS. 11-13. The untethered drone may be at least one of a buoyant or aerodynamic object with or without propulsion. The propulsion may be a single-axis thruster or a multi-axis thruster. The untethered drones are not secured with tethers. This allows the untethered drone to reposition itself according to the needs of the communications network. The untethered drones need sufficient power source to stay aloft continuously for extended periods of time. The untethered drones may also use harvesting devices, such as solar cells, photodiodes for laser beam harvesting, or the like.

Figure 11:
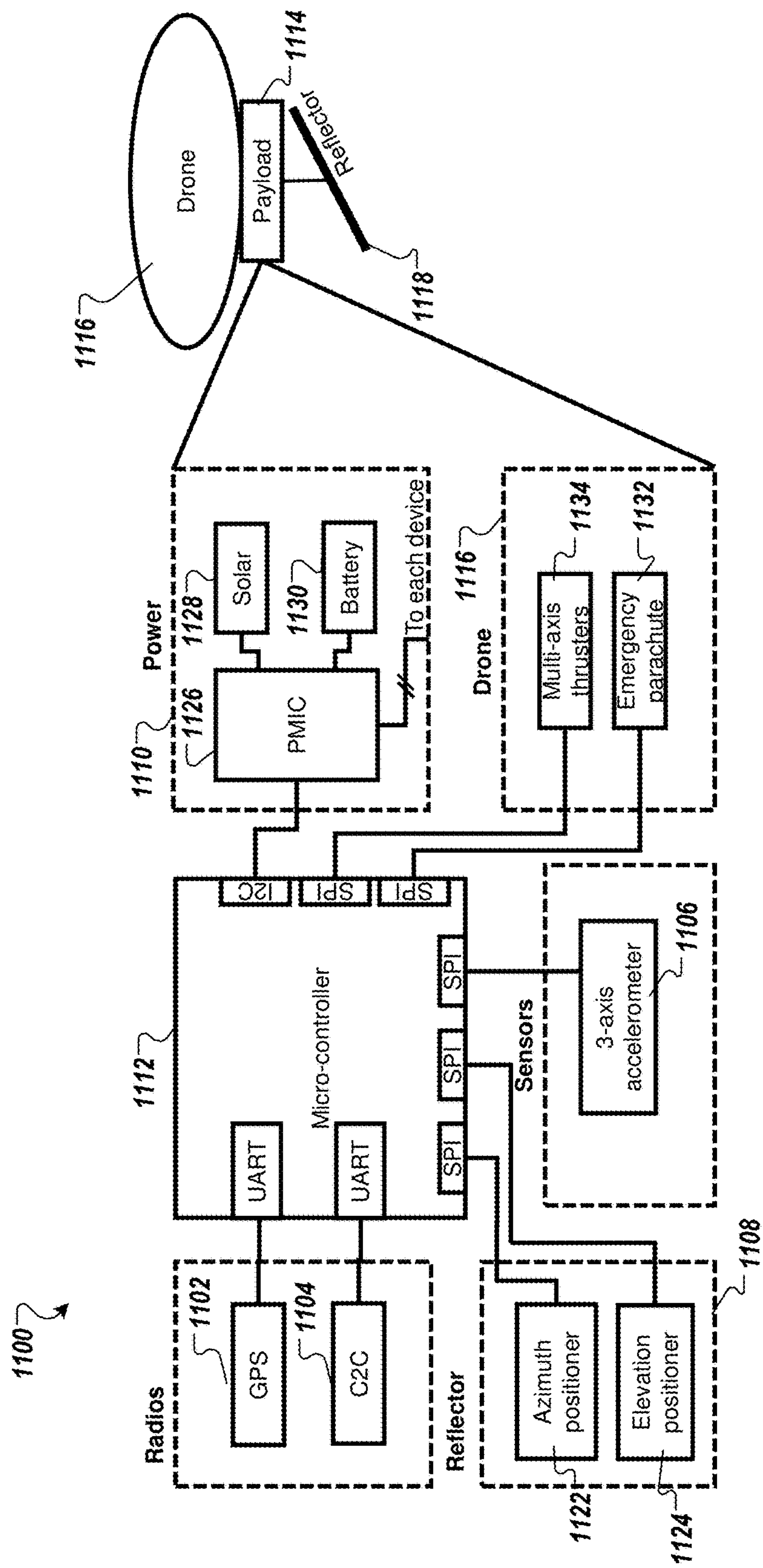
FIG. 11 is a block diagram of an aerial reflector device attached as a payload of an untethered drone according to one embodiment.

FIG. 11 is a block diagram of an aerial reflector device 1100 attached as a payload 1114 of an untethered drone 1116 according to one embodiment. The aerial reflector device 1100 includes a reflector 1118 that includes a reflective surface and one or more electromechanical components that can be controlled to adjust a location, an orientation, or both of the reflective surface to provide the terrestrial NLOS communication path as described herein. The aerial reflector device 1100 also includes electronics disposed in the payload 1114 of the untethered drone 1116. The untethered drone 1116 includes an aircraft (various types illustrated in FIGS. 12A-12B) with the payload 1114. Unlike the tethered drone 816, the untethered drone 1116 is not tethered to the ground or a structure and can reposition itself according to the needs of the communication network.

As illustrated in FIG. 11, the electronics of the aerial reflector device 1100 may include a GPS radio 1102 (or other type of GNSS radio), a C2Cradio 1104, a three-axis accelerometer 1106, a positioning subsystem 1108, a power supply subsystem 1110, and a micro-controller 1112. The GPS radio 1102 generates current location of the aerial reflector device 1100 using timing signals transmitted along a line of sight from satellites and the C2C radio 1104 communicates control data over a PtP C2C link with a radio of the first HAN relay device (e.g., 158 of FIG. 1B), a radio of the second HAN relay device (e.g., 160 of FIG. 1B), or both. The three-axis accelerometer 1106 generates acceleration data. The positioning subsystem 1108 is coupled to the reflective surface of the reflector 1118 and is configured to electrically or electromechanically control the location and the orientation of the reflective surface. The power supply subsystem 1110 supplies power to components of the aerial reflector device 1100. In the depicted embodiment, the power supply subsystem 1110 includes a PMIC 1126, a solar system 1128, and a battery 1130. The PMIC 1126 manages power requirements of the micro-controller 1112, as well as other components of the aerial reflector device 1100. The battery 1130 can store power for the aerial reflector device 1100. The battery 1130 can be rechargeable. In another embodiment, the power supply subsystem 1110 can include a power connection through the tethers 1120. Power can be supplied to the aerial reflector device 1100 through this connection, in place of or in addition to the battery 1130, solar system 1128, or both. The micro-controller 1112 is coupled to the GPS radio 1102 via a first interface (e.g., a UART interface) and the C2C radio 1104 via a second interface (e.g., a UART interface). The micro-controller 1112 is coupled to the three-axis accelerometer 1106 via a third interface (e.g., a serial peripheral interface (SPI)). The micro-controller 1112 is coupled to the power supply subsystem over a fourth interface (e.g., I2C). The micro-controller 1112 is coupled to the positioning subsystem 1108 via a fifth interface (e.g., one or more SPI interfaces). The micro-controller 1112 may also include an interface to communicate with one or more components of the untethered drone 1116, such as an emergency parachute system 1132 and a multi-axis thruster 1134. This interface may be a SPI. Although certain types of interfaces are illustrated, other types of interfaces may be used between components.

In one embodiment, the positioning subsystem 1108 includes an azimuth positioner 1122 and an elevation positioner 1124. The azimuth positioner 1122 is configured to adjust an azimuth angle of the reflective surface of the reflector 1118. The elevation positioner 1124 is configured to adjust an elevation of the reflective surface of the reflector 1118. The micro-controller 1112 is further configured to communicate the one or more control signals to the untethered drone 1116, the azimuth positioner 1122, the elevation positioner 1124, or any combination thereof.

During operation, in one embodiment, the micro-controller 1112 receives control data from the C2C radio 1104. The control data includes a specified location and a specified orientation of the aerial reflector device 1100 such that the reflective surface provides the terrestrial NLOS communication path between a first radio of a first HAN relay device and a first radio of a second HAN relay device. The micro-controller 1112 receives the current location of the aerial reflector device 1100 from the GPS radio 1102 and the acceleration data from the three-axis accelerometer 1106 to determine a current location and a current orientation of the aerial reflector device 1100. The micro-controller 1112 communicates one or more control signals to the positioning subsystem 1108 and one or more control signals to the multi-axis thruster 1134, in view of the current location and the current orientation, to maintain the aerial reflector device 1100 in the specified location and the specified orientation.

The untethered drone 1116 is one type of aero-dynamical mechanism that can be used to position and orient the aerial reflector device 1100. The untethered drone 1116 may be at least one of a buoyant or aerodynamic object with propulsion. The propulsion may be a single-axis thruster or a multi-axis thruster. Various types of untethered drones may be used, such as those illustrated and described with respect to FIGS. 12A-12B.

Figures 12A, 12B:
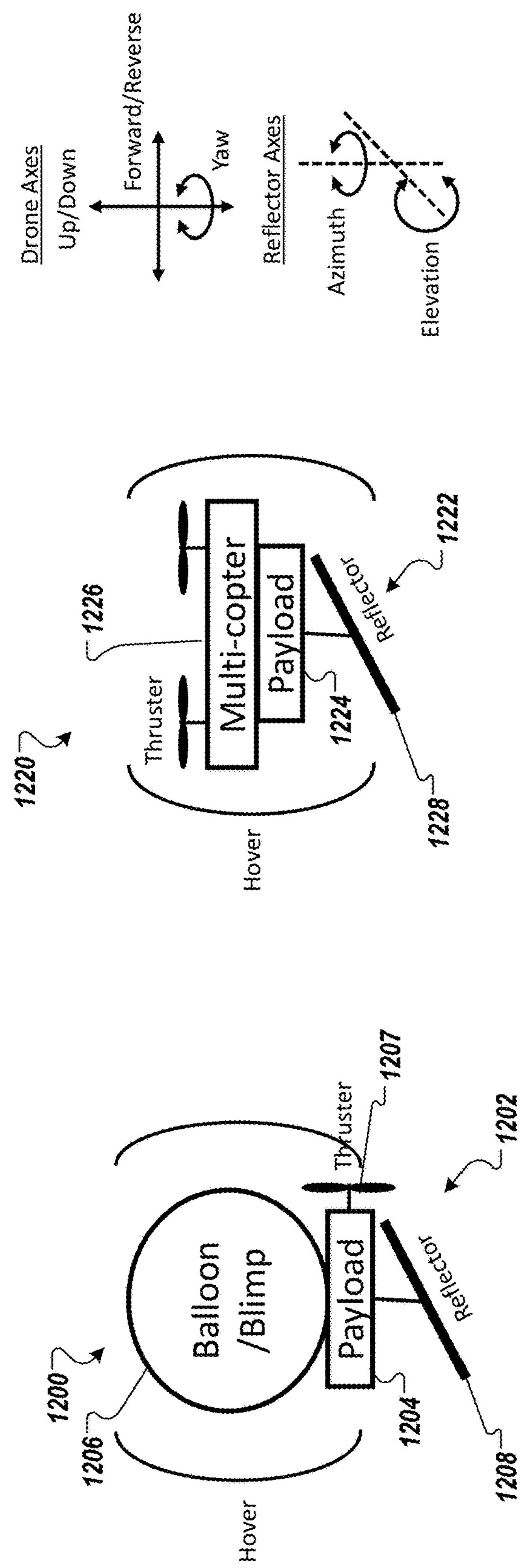
FIG. 12A is an aerial reflector device on a first type of untethered drone according to one embodiment.
FIG. 12B is an aerial reflector device on a second type of untethered drone according to one embodiment.

FIG. 12A is an aerial reflector device on a first type of untethered drone 1200 according to one embodiment. The first type of untethered drone 1200 includes a balloon aircraft 1206 having a payload 1204 to which a reflector 1208 is secured. Unlike the tethered drone 900, the balloon aircraft 1206 hovers above the installation site using buoyancy of the balloon aircraft 1206. The untethered drone 1220 uses one or more thrusters to reposition and reorient the reflector 1208 according to a specified location and a specified orientation. The electronics of the aerial reflector device are attached as the payload 1204 of the balloon aircraft 1206.

FIG. 12B is an aerial reflector device on a second type of untethered drone 1220 according to one embodiment. The second type of untethered drone 1220 includes a multi-copter aircraft 1226 having a payload 1224 to which a reflector 1228 is secured. The. The multi-copter aircraft 1226 hovers above the installation site using multiple thrusters to reposition and reorient the reflector 1228 according to a specified location and a specified orientation. The electronics of the aerial reflector device are attached as the payload 1224 of the multi-copter aircraft 1226. In other embodiments, the untethered drone may be other types of balloon aircrafts, single-rotor helicopters, dual-rotor helicopters, multirotor aircrafts (e.g., tricopter, quadcopter, hexacopter, or octocopter), or the like.

Figure 13:
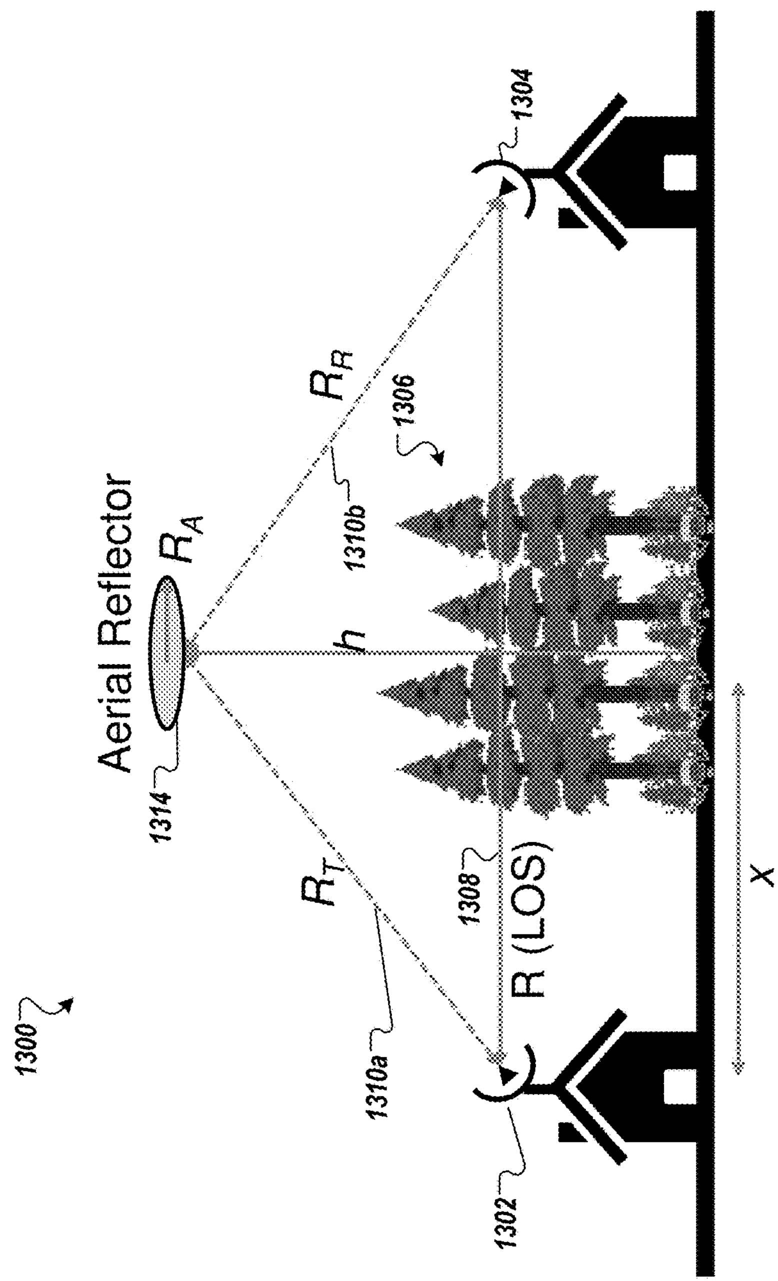
FIG. 13 illustrates an untethered drone with an aerial reflector device used with two HAN relay devices with NLOS in a lateral plane according to one embodiment.

FIG. 13 illustrates an untethered drone 1300 with an aerial reflector device 1314 used with two HAN relay devices 1302, 1304 with NLOS in a lateral plane according to one embodiment. As illustrated, an obstruction 1006 prevents a LOS communication path 1308 in the lateral plane between directional antennas of the two HAN relay devices 1302, 1304. The aerial reflector device 1314 provides a NLOS communication path 1310 (segment 1310*a* and 1310*b*) between directional antennas of the two HAN relay devices 1302, 1304. That is a radio of the first HAN relay device 1302 radiates electromagnetic energy via a directional antenna towards a reflective surface of the aerial reflector device 1314 over the segment 1310*a*. The reflective surface reflects the electromagnetic energy as reflective electromagnetic energy towards a directional antenna of the second HAN relay device 1304 over the segment 1310*b*.

In this embodiment, the aerial reflector device 1314 is positioned at a specified location and with a specified orientation using the untethered drone 1300 to provide the NLOS communication path 1010.

In one embodiment, the untethered drone 1300 operates at 73 GHz and can be a compact, light, lower power, and stable design. The design can be compact with a 0.5 balloon aircraft and a 0.2 m reflective surface. The design can be light with 0.5 lbs. payload or less. The design can be lower power and operate with 1 Watt or less. The design can be stable with a multi-axis thrust and buoyancy system. Table 4 provides the list of parameters, units, LOS, NLOS, and description of each of the parameters:

TABLE 4

| Parameter | Units | LOS | NLOS | Description |
|---|---|---|---|---|
| # Trees | — | 4 | — | Number of tress in LOS path |
| Loss/Tree | dB | 15.0 | — | Average dB of loss per tree @ $f_c$ (carrier frequency) |
| Rain Fade | dB | 20.0 | 20.0 | Assumed dB of rain fade |
| $R_a$ | m | — | 0.50 | Radius of aerial reflector |
| R (LOS) Fade | m | 1000.0 | 1000.0 | Line of sight range |
| h | m | — | 1000.0 | altitude of aerial reflector |
| x | m | — | 500.0 | horizontal distance from TX site to aerial reflector |
| $R_r$ | m | — | 1118.0 | lines of sight range from RX to aerial reflector |

TABLE 4-continued

| Parameter | Units | LOS | NLOS | Description |
|---|---|---|---|---|
| $R_t$ | m | — | 1118.0 | line of sign from TX to aerial reflector |
| RCS | dBsm | — | 56.6 | radar cross section of aerial reflector |
| Loss | dB | 209.7 | 166.0 | Total Path Loss |
| NLOS Margin | dB | 43.7 | | Difference between NLOS − LOS losses |

Various embodiments described above are directed to tethered and untethered drones. The aerial reflector devices can also be secured to pole mount assemblies as described below with respect to FIGS. 14-15.

Figure 14:
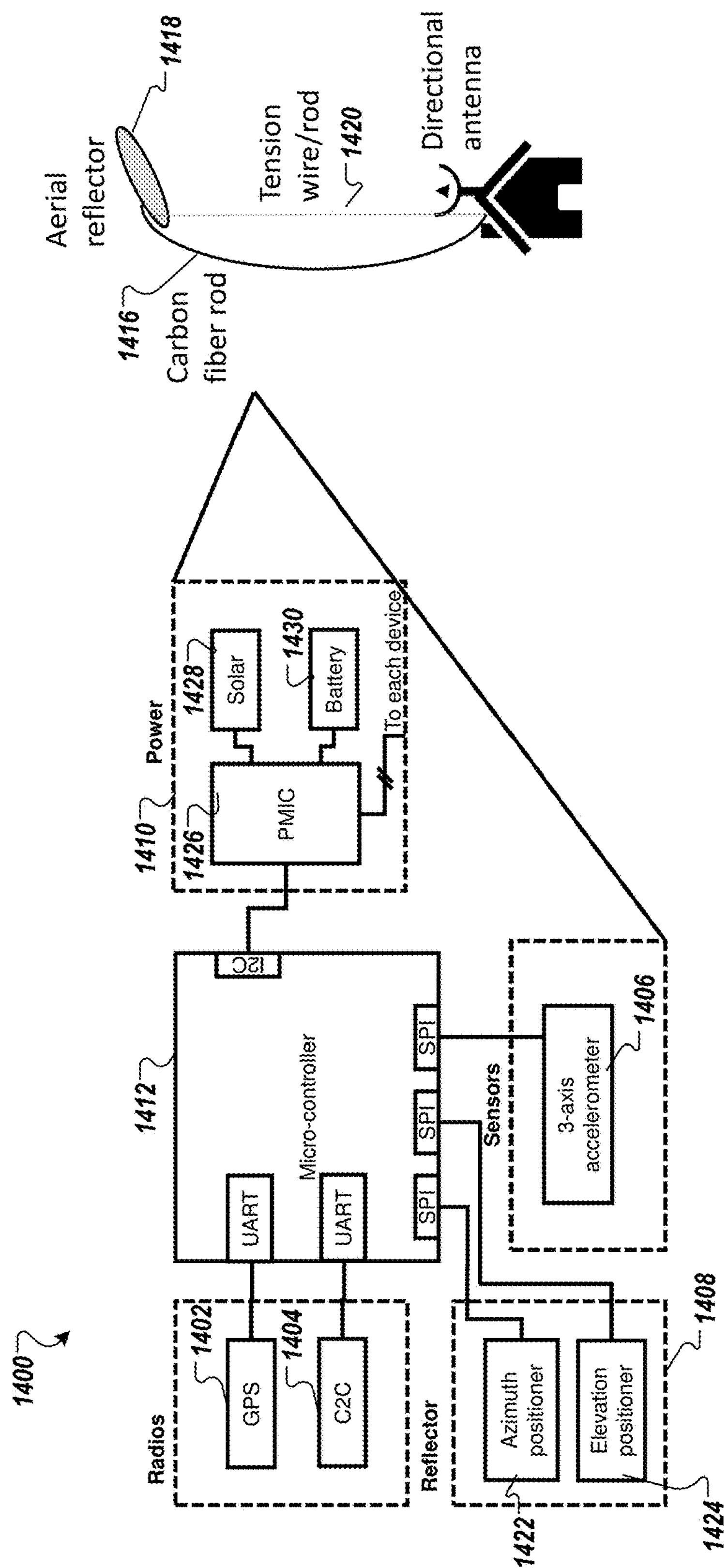
FIG. 14 is a block diagram of an aerial reflector device attached to a pole mount assembly according to one embodiment.

FIG. 14 is a block diagram of an aerial reflector device 1400 attached to a pole mount assembly according to one embodiment. The aerial reflector device 1400 includes a pole mount assembly with a pole 1416 and a pole mount coupled to the pole and the aerial reflector device 1400 at a first end and to the ground or a structure on the ground at a second end. The pole assembly can include one or more wires to support the pole 1416. For example, in the depicted embodiment, the pole mount assembly is a first type of pole mount assembly that specifically includes a carbon fiber rod attached to the aerial reflectors 1418 and the structure and a single tension wire (or tension rod) 1420 attached between the pole mount and the structure as well. The tension cable 1420 cause the carbon fiber rod (pole 1416) to bend into a curved shape as illustrated.

The aerial reflector device 1400 includes a reflector 1418 that includes a reflective surface and one or more electromechanical components that can be controlled to adjust a location, an orientation, or both of the reflective surface to provide the terrestrial NLOS communication path as described herein. The aerial reflector device 1400 also includes electronics attached or otherwise disposed in connection with the pole mount assembly that is connected to the aerial reflectors 1418. Alternatively, some of the electronics can be disposed at the installation site and communicate over control lines in connection with the pole (and/or tension wires).

As illustrated in FIG. 14, the electronics of the aerial reflector device 1400 may include a GPS radio 1402 (or other type of GNSS radio), a C2Cradio 1404, a three-axis accelerometer 1406, a positioning subsystem 1408, a power supply subsystem 1410, and a micro-controller 1412. The GPS radio 1402 generates current location of the aerial reflector device 1400 using timing signals transmitted along a line of sight from satellites and the C2C radio 1404 communicates control data over a PtP C2C link with a radio of the first HAN relay device (e.g., 158 of FIG. 1B), a radio of the second HAN relay device (e.g., 160 of FIG. 1B), or both. It should be noted that in other embodiments, the aerial reflector device may not include the GPS radio 1402 and the positioning data may be determine based on the location of the installation of the pole, for example. The three-axis accelerometer 1406 generates acceleration data. The positioning subsystem 1408 is coupled to the reflective surface of the aerial reflector 1418 and is configured to electrically or electromechanically control the location and the orientation of the reflective surface. The power supply subsystem 1410 supplies power to components of the aerial reflector device 1400. In the depicted embodiment, the power supply subsystem 1410 includes a PMIC 1426, a solar system 1428, and a battery 1430. The PMIC 1426 manages power requirements of the micro-controller 1412, as well as other components of the aerial reflector device 1400. The battery 1430 can store power for the aerial reflector device 1400. The battery 1430 can be rechargeable. In another embodiment, the power supply subsystem 1410 can include a power connection through the pole or tension wires. Power can be supplied to the aerial reflector device 1400 through this connection, in place of or in addition to the battery 1430, solar system 1428, or both. The micro-controller 1412 is coupled to the GPS radio 1402 via a first interface (e.g., a UART interface) and the C2C radio 1404 via a second interface (e.g., a UART interface). The micro-controller 1412 is coupled to the three-axis accelerometer 1406 via a third interface (e.g., a serial peripheral interface (SPI)). The micro-controller 1412 is coupled to the power supply subsystem over a fourth interface (e.g., I2C). The micro-controller 1412 is coupled to the positioning subsystem 1408 via a fifth interface (e.g., one or more SPI interfaces). Although certain types of interfaces are illustrated, other types of interfaces may be used between components.

In one embodiment, the positioning subsystem 1408 includes an azimuth positioner 1422 and an elevation positioner 1424. The azimuth positioner 1422 is configured to adjust an azimuth angle of the reflective surface of the reflector 1418. The elevation positioner 1424 is configured to adjust an elevation of the reflective surface of the reflector 1418. The micro-controller 1412 is further configured to communicate the one or more control signals to the positioning subsystem 1408, such as to the azimuth positioner 1422, the elevation positioner 1424, or any combination thereof.

During operation, in one embodiment, the micro-controller 1412 receives control data from the C2C radio 1404. The control data includes a specified location and a specified orientation of the aerial reflector device 1400 such that the reflective surface provides the terrestrial NLOS communication path between a first radio of a first HAN relay device and a first radio of a second HAN relay device. The micro-controller 1412 receives the current location of the aerial reflector device 1400 from the GPS radio 1402 and the acceleration data from the three-axis accelerometer 1406 to determine a current location and a current orientation of the aerial reflector device 1400. The micro-controller 1412 communicates one or more control signals to the positioning subsystem 1408, in view of the current location and the current orientation, to maintain the aerial reflector device 1400 in the specified location and the specified orientation.

The aerial reflector device 1400 is one type of pole mount assemblies that can be used to position and orient the aerial reflector device 1400. The aerial reflector device 1400 can be mounted on a very tall pole, such as 10-30 m. The pole needs to be support its own weight and a small payload under required wind, rain, snow, and ice conditions. Various types of pole mount assemblies may be used, such as the one illustrated in FIG. 14, as well as the one illustrated and described with respect to FIG. 15.

Figure 15:
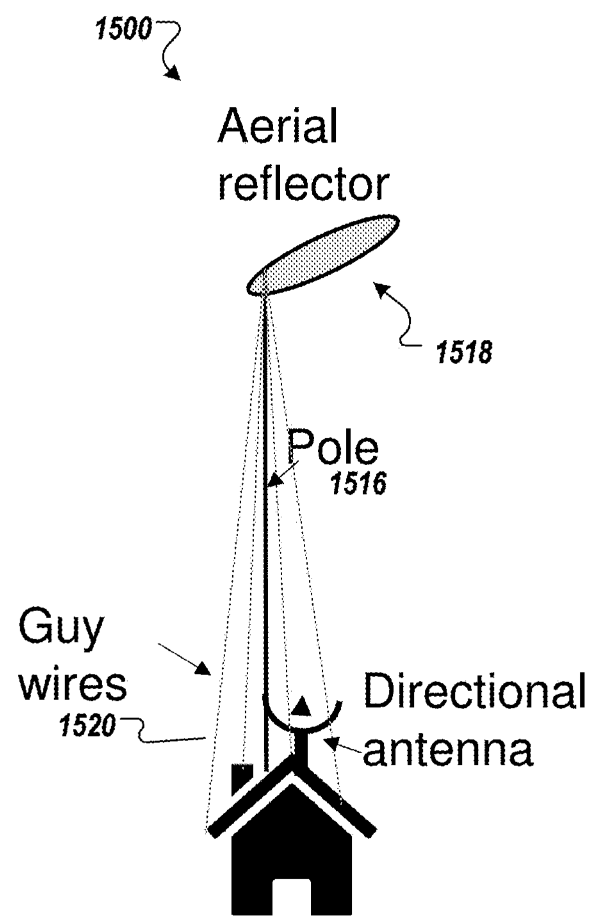
FIG. 15 is an aerial reflector device on a second type of pole mount assembly according to one embodiment.

FIG. 15 is an aerial reflector device on a second type of pole mount assembly 1500 according to one embodiment. The second type of pole mount assembly 1500 includes a free-standing pole 1516 that is coupled to a first pole mount at an aerial reflector device 1518 and a second pole mount at the ground or a structure on the ground at an installation site. The second type of pole mount assembly 1500 also includes a set of one or more tension cables 1520 coupled between the first pole mount and the second pole mount. The set of one or more tension cables 1520 may be guy-wires, guy-lines, or guy-ropes or other tensioned cables designed to add stability to the free-standing pole 1516. For example, a first tension cable is coupled to a pole mount at a first location on the ground or structure and a second cable is coupled to a pole mount at a second location on the ground or structure that is different than the first location. The first tension cable and the second tension cable add stability to the free-standing pole 1516. More than two tension cables may be used to add additional stability.

In another embodiment, the pole mount assembly includes a pole, a first pole mount and a second pole mount. The pole is couple between the first pole mount and the second pole mount. In another embodiment, additional pole mounts can be disposed to which the set of tension cables 1520 can be secured.

Figure 16:
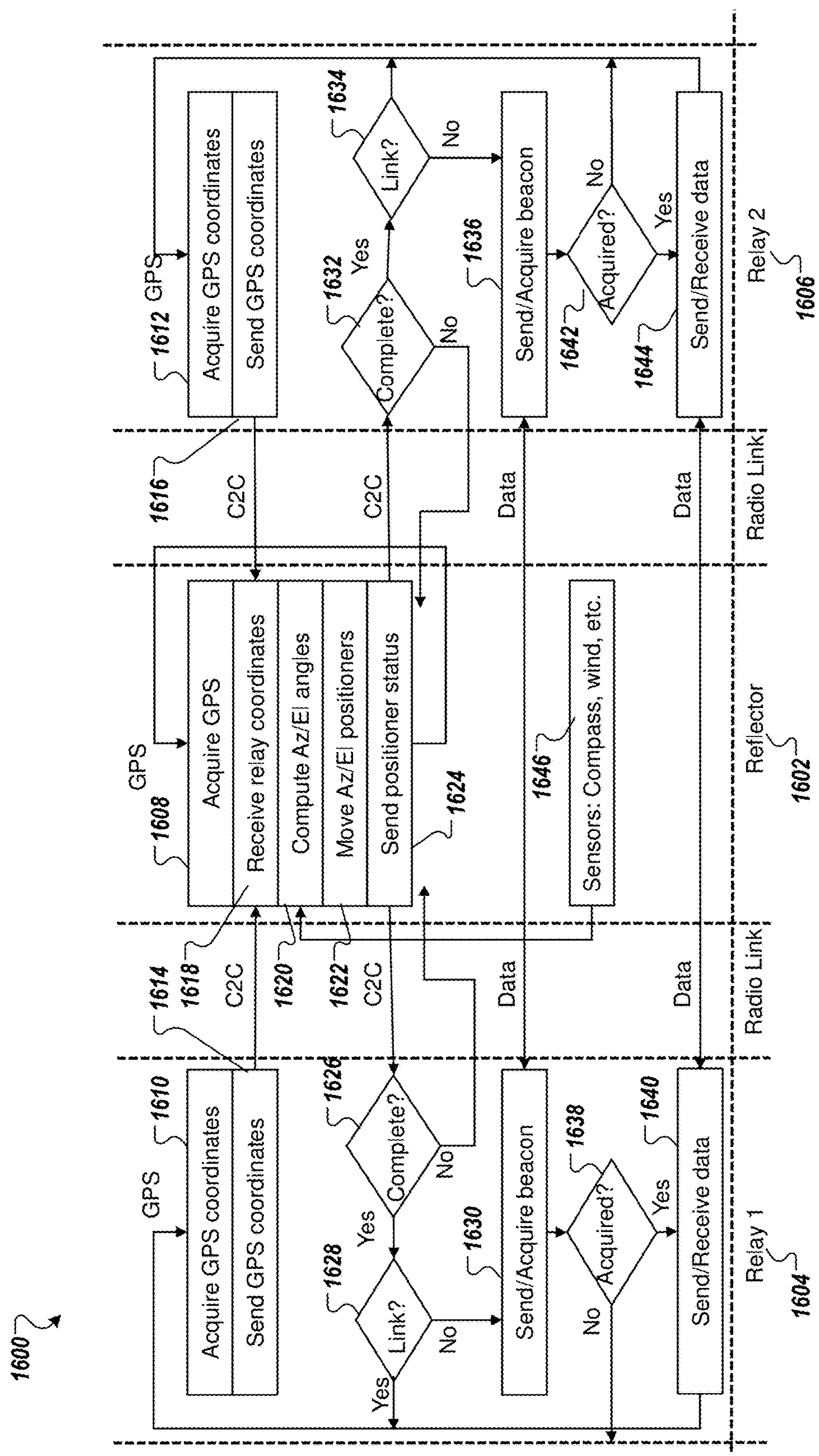
FIG. 16 is a sequence diagram illustrating a method of reflector alignment according to one embodiment.

FIG. 16 is a sequence diagram illustrating a method 1600 of reflector alignment according to one embodiment. The method 600 may be performed by an aerial reflector device 1602, a first HAN relay device 1604, and a second HAN relay device 1606. The operations described herein may be performed by hardware, software, firmware, or any combination thereof of the respective device. In one embodiment, the operations of the aerial reflector device 1602 are performed by a micro-controller (e.g., micro-controller 812, 1112, 1412). The operations of the HAN relay devices may be performed by their respective application processor (e.g., application processor 540).

Referring to FIG. 16, the method 1600 begins with the aerial reflector device 1602 acquiring GPS coordinates from a GPS radio (or other GNSS radio) (block 1608). Similarly, the first HAN relay device 1604 acquires its GPS coordinates (block 1610) and the second HAN relay device 1606 acquires its GPS coordinates (block 1612). The first HAN relay device 1604 sends its GPS coordinates to the aerial reflector device 1602 (block 1614) and the second HAN relay device 1606 sends its GPS coordinates to the aerial reflector device 1602 (block 1616). These coordinates can be sent over the respective C2C links described herein. The aerial reflector device 1602 receives the relay coordinates (block 1618) and computes the azimuth angle and elevation angle (block 1620) and controls the respective positioners to position the aerial reflector device 1602 accordingly. The aerial reflector device 1602 sends a positioner status (block 1624) over the C2C link to the first HAN relay device 1604 and the second HAN relay device 1606. The first HAN relay device 1604 receives the positioner status and determines if the alignment operation is complete (block 1626). If the alignment operation is not complete, the first HAN relay device 1604 sends a status to the aerial reflector device 1602. If the alignment operation is complete at block 1626, the first HAN relay device 1604 determines if there is a data link between the first HAN relay device 1604 and the second HAN relay device 1606 (block 1628). If there is no data link, the first HAN relay device 1604 sends (or receives) a beacon to (or from) the second HAN relay device 1606. Similarly, the second HAN relay device 1606 receives the positioner status and determines if the alignment operation is complete (block 1632). If the alignment operation is not complete, the second HAN relay device 1606 sends a status to the aerial reflector device 1602. If the alignment operation is complete at block 1636, the second HAN relay device 1606 determines if there is a data link between the first HAN relay device 1604 and the second HAN relay device 1606 (block 1634). If there is no data link, the second HAN relay device 1606 sends (or receives) a beacon to (or from) the second HAN relay device 1606.

At block 1638, the first HAN relay device 1604 determines whether the beacon is acquired from the second HAN relay device 1606. If not, the first HAN relay device 1604 returns to acquire its GPS coordinates at block 1610. If the beacon has been acquired at block 1638, the first HAN relay device 1604 communicates data with the second HAN relay device 1606 over the data link. Similarly, at block 1642, the second HAN relay device 1606 determines whether the beacon is acquired from the first HAN relay device 1604. If not, the second HAN relay device 1606 returns to acquire its GPS coordinates at block 1612. If the beacon has been acquired at block 1642, the second HAN relay device 1606 communicates data with the first HAN relay device 1604 over the data link.

In other embodiments, other operations than those illustrated in FIG. 16 may be used to align the aerial reflector device 1602 to provide NLOS communications between the first HAN relay device 1604 and the second HAN relay device 1606. In some embodiments, the method 1600 can be used in connection with other beam steering algorithms used to align each antenna with the aerial reflector device 1602. These beam steering algorithms may be those in standard protocols (e.g., IEEE 802.11ac, 802.11ad). Alternatively, other beam steering algorithms may be used in connection with the methods described herein.

Although the method 1600 is directed to HAN relay to HAN relay communications, in another embodiment, a similar method can be used to establish a NLOS communication path between a HAN relay device and a HAN device. Alternatively, the methods described herein may be used between other hardware network devices.

Figure 17:
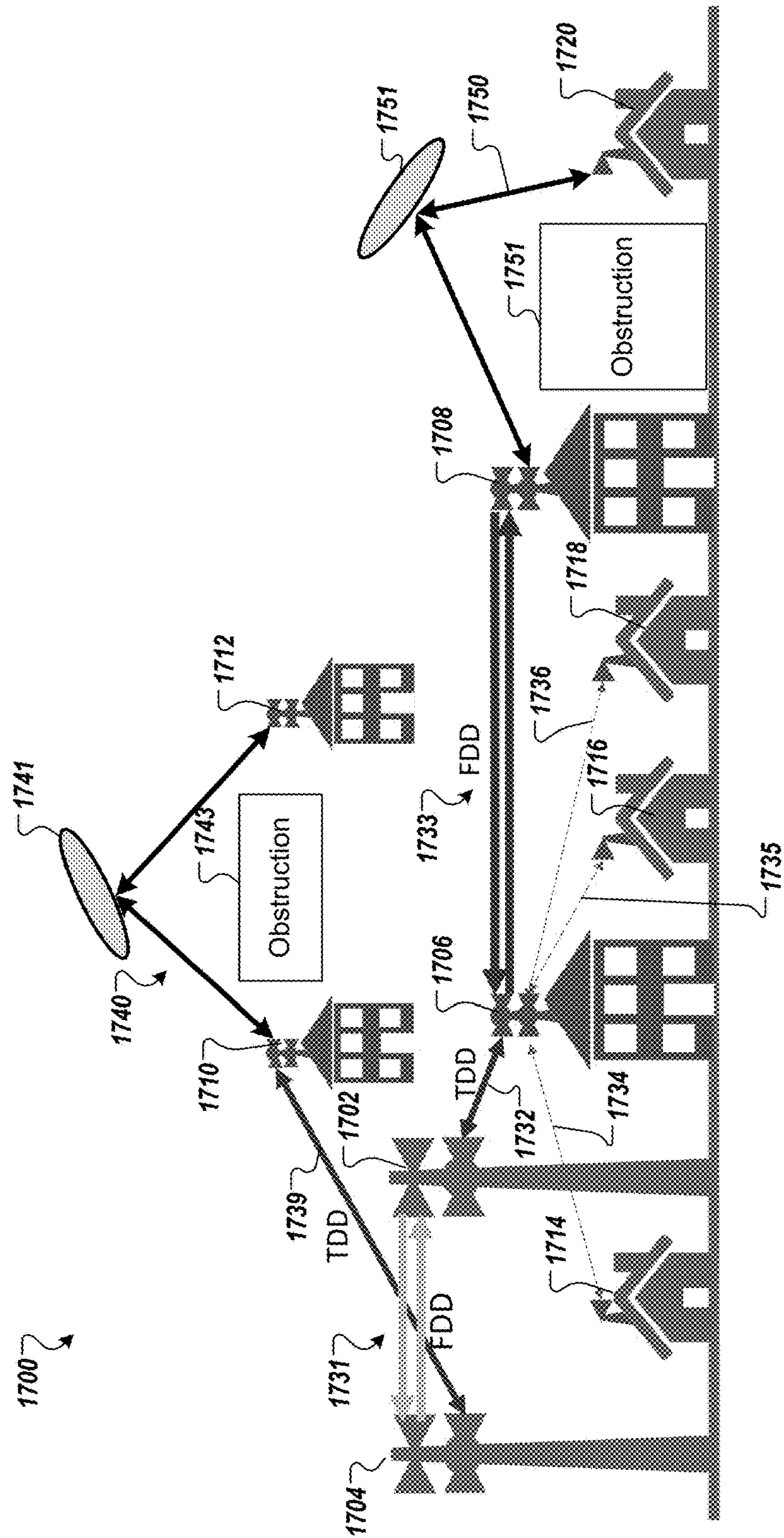
FIG. 17 illustrates a portion of a WMN with two BSN devices, four HAN relay devices, and five HAN devices and corresponding wireless links according to one embodiment.

FIG. 17 illustrates a portion of a WMN 1700 with two BSN devices 1702, 1704, four HAN relay devices 1706-1712, and five HAN devices 1714-1722 and corresponding wireless links according to one embodiment. In the WMN 1700, a first BSN device 1702 communicates with a second BSN device 1704 via FDD links 1731. The first BSN device 1702 communicates with a first HAN relay device 1706 via TDD link 1732. The first HAN relay device 1706 communicates with a second HAN relay device 1708 via FDD links 1733 and communicates with a first HAN device 1714 via a first wireless connection 1734, a second HAN device 1716 via a second wireless connection 1735, and a third HAN device 1718 via a third wireless connection 1736. The second HAN relay device 1708 communicates with a fourth HAN device 1720 via a fourth wireless connection 1737 (link) using an aerial reflector device 1750 to avoid an obstruction 1751. The obstruction 1751 may prevent LOS between the second HAN relay device 1708 and the fourth HAN device 1720. The second BSN device 1704 communicates with a third HAN relay device 1710 via TDD link 1739. The third HAN relay device 1710 communicates with a fourth HAN relay device 1712 via FDD links 1740 using an aerial reflector device 1741 to avoid an obstruction 1743. The obstruction 1743 may prevent LOS between the third HAN relay device 1710 and the fourth HAN relay device 1712. The third HAN relay device 1710 and fourth HAN relay device 1712 may also individually communicate with one or more HAN devices at their respective sites.

In one embodiment, the links are established according Table 5 below:

TABLE 5

| Link | Access Type | Frequency Band | Access Technology | Antenna Type | Link Distance (approx.) |
|---|---|---|---|---|---|
| BSN ←→ BSN | FDD | 70 GHz or 80 GHz (E-band - no interference) | Specialized Hardware Technology | Dish/Horn | ~1 Km |
| BSN ←→ HanR | TDD Or FDD | 60 GHz (TDD) or 70 GhHz/80 GHz (FDD) | 802.11ad or Specialized Hardware Technology | 23 dBi array antenna Or Dish/Horn | ~100 m or ~100-1 Km if E-band |
| HanR ←→ HanR | FDD | 60 GHz | Modified 802.11ad | 23 dBi array antenna | ~300 m |
| HanR ←→ Han | CSMA | 60 GHz + 5 GHz | 802.11ad + 802.11ac MU-MIMO | 23 dBi array antenna for 60 GHz, omni for 5 GHz | <100 m |

Figure 18:
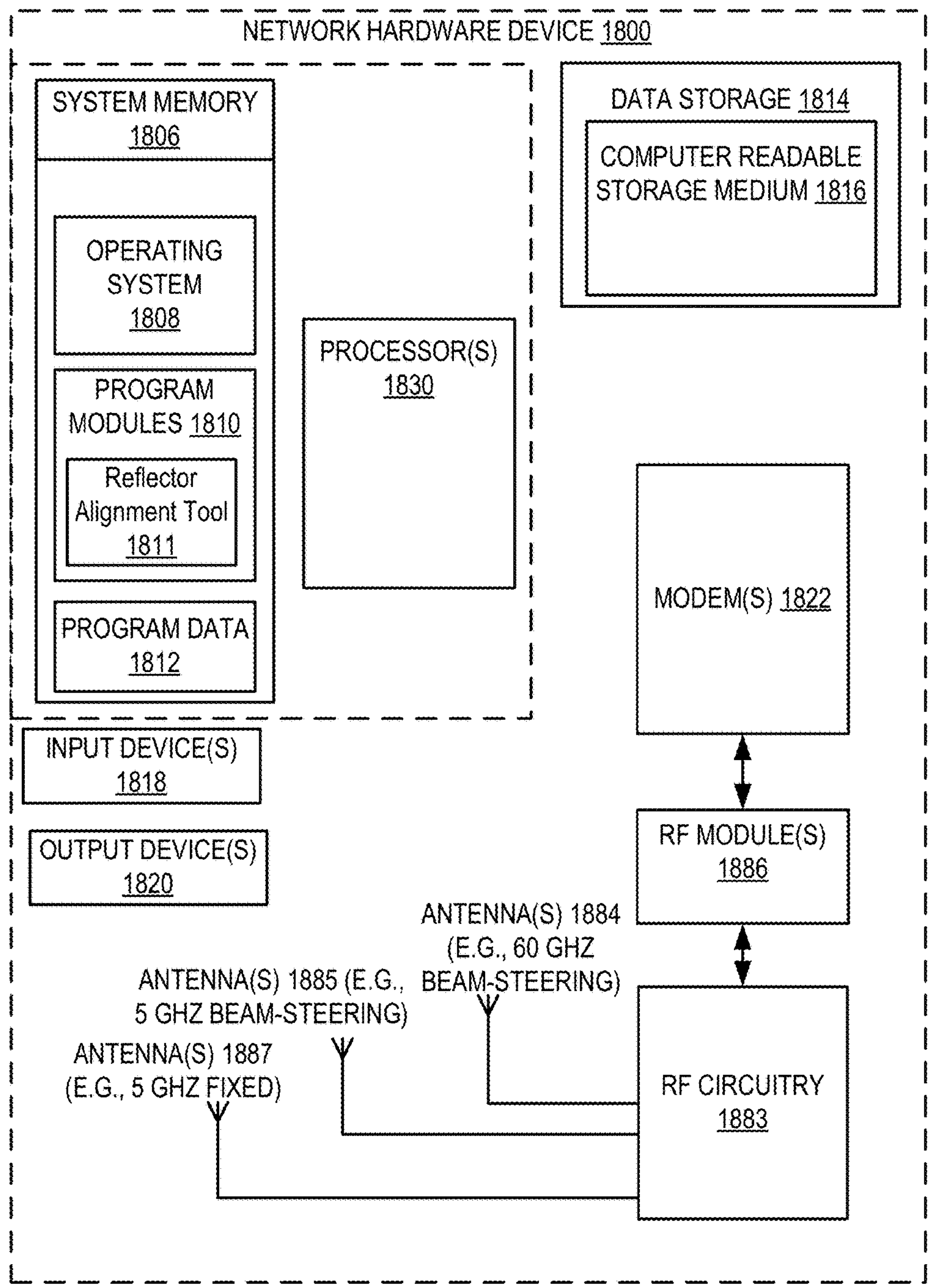
FIG. 18 is a block diagram of a network hardware device according to one embodiment.

FIG. 18 is a block diagram of a network hardware device 1800 according to one embodiment. The network hardware device 1800 may correspond to any one of the network hardware device described herein. The network hardware device 1800 includes one or more processor(s) 1830, such as one or more CPUs, microcontrollers, field programmable gate arrays, or other types of processors. The network hardware device 1800 also includes system memory 1806, which may correspond to any combination of volatile and/or non-volatile storage mechanisms. The system memory 1806 stores information that provides operating system component 1808, various program modules 1810, program data 1812, and/or other components. In one embodiment, the system memory 1806 stores instructions of methods to control operation of the network hardware device 1800. The network hardware device 1800 performs functions by using the processor(s) 1830 to execute instructions provided by the system memory 1806.

The network hardware device 1800 also includes a data storage device 1814 that may be composed of one or more types of removable storage and/or one or more types of non-removable storage. The data storage device 1814 includes a computer-readable storage medium 1816 on which is stored one or more sets of instructions embodying any of the methodologies or functions described herein. Instructions for the program modules 1810 may reside, completely or at least partially, within the computer-readable storage medium 1816, system memory 1806 and/or within the processor(s) 1830 during execution thereof by the network hardware device 1800, the system memory 1806 and the processor(s) 1830, also constituting computer-readable media. The program modules 1810 may include a reflector alignment tool 1811 that is used to align a directional antenna of the device to an aerial reflector device as described herein. The network hardware device 1800 may also include one or more input devices 1818 (keyboard, mouse device, specialized selection keys, etc.) and one or more output devices 1820 (displays, printers, audio output mechanisms, etc.).

The network hardware device 1800 further includes a modem 1822 to allow the network hardware device 1800 to communicate via a wireless connections (e.g., such as provided by the wireless communication system) with other computing devices, such as remote computers, an item providing system, and so forth. The modem 1822 can be connected to one or more RF modules 1886. The RF modules 1886 may be a WLAN module, a WAN module, PAN module, GPS module, a 60 GHz radio, a 5 GHz radio, or the like, as described herein. The antenna structures (antenna(s) 1884, 1885, 1887) are coupled to the RF circuitry 1883, which is coupled to the modem 1822. The RF circuitry 1883 may include radio front-end circuitry, antenna switching circuitry, impedance matching circuitry, or the like. The antennas 1884 may be GPS antennas, NFC antennas, other WAN antennas, WLAN or PAN antennas, beam-steering antennas, fixed-beam antennas, or the like. The modem 1822 allows the network hardware device 1800 to handle both voice and non-voice communications (such as communications for text messages, multimedia messages, media downloads, web browsing, etc.) with a wireless communication system. The modem 1822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1822 may generate signals and send these signals to antenna(s) 1884 of a first type (e.g., 60 GHz beam-steering antennas), antenna(s) 1885 of a second type (e.g., 5 GHz beam-steering antenna), and/or antenna(s) 1887 of a third type (e.g., 5 GHz fixed-beam), via RF circuitry 1883, and RF module(s) 1886 as descried herein. Antennas 1884, 1885, 1887 may be configured to transmit in different frequency bands and/or using different wireless communication protocols. The antennas 1884, 1885, 1887 may be directional, omnidirectional, or non-directional antennas. In addition to sending data, antennas 1884, 1885, 1887 may also receive data, which is sent to appropriate RF modules connected to the antennas. One of the antennas 1884, 1885, 1887 may be any combination of the antenna structures described herein.

In one embodiment, the network hardware device 1800 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh network devices of the WMN and the second wireless connection may be associated with serving a content file to a client consumption device, as described herein.

Though a modem 1822 is shown to control transmission and reception via antenna (1884, 1885, 1887), the network hardware device 1800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such are entitled.

What is claimed is:

1. A wireless mesh network (WMN) comprising:

a first home access node (HAN) relay device positioned at a first terrestrial location;

a second HAN relay device positioned at a second terrestrial location at which there is no line-of-sight (LOS) with the first HAN relay device:

the first HAN relay device comprising:

a first radio to communicate with the second HAN relay device; and a first plurality of radios each to communicate with a HAN device of a first set of HAN devices, wherein each HAN device of the first set of HAN devices is an access point that provides Internet connectivity to a client consumption device connected to the respective HAN device:

the second HAN relay device comprising:

a first radio to communicate with the first HAN relay device; and a second plurality of radios each to communicate with a HAN device of a second set of HAN devices, wherein each HAN device of the second set of HAN devices is an access point that provides Internet connectivity to a client consumption device connected to the respective HAN device; and an aerial reflector device positioned at an aerial location above the first terrestrial location and the second terrestrial location, the aerial reflector device comprising a reflective surface that is positioned and oriented to provide a non-line-of-sight (NLOS) communication path between the first radio of the first HAN relay device and the first radio of the second HAN relay device, wherein the aerial location is at an altitude between approximately 10 meters and 20 kilometers above the first terrestrial location and the second terrestrial location.

2. The WMN of claim 1, further comprising an untethered drone, wherein the aerial reflector device is attached to the untethered drone, wherein the aerial reflector device further comprises:

a global navigation satellite system (GNSS) radio to generate a current location of the aerial reflector device using timing signals transmitted along a line of sight from satellites;

a radio to communicate control data over a point-to-point (PtP) command and control (C2C) link with the first radio of the first HAN relay device, the first radio of the second HAN relay device, or both;

a three-axis accelerometer;

a positioning subsystem coupled to the reflective surface, the positioning subsystem configured to electrically or electromechanically control an orientation of the reflective surface;

a power supply subsystem to supply power to components of the aerial reflector device; and a micro-controller coupled to the GNSS radio, the radio, the three-axis accelerometer, the positioning subsystem, and the power supply, wherein the micro-controller is configured to:

receive control data from the radio, the control data comprising a specified location of the aerial reflector device and a specified orientation of the reflective surface such that the reflective surface provides the NLOS communication path between the first radio of the first HAN relay device and the first radio of the second HAN relay device;

receive the current location of the aerial reflector device from the GNSS radio;

receive acceleration data from the three-axis accelerometer to determine a current orientation of the reflective surface; and communicate one or more control signals to adjust at least one of an azimuth adjuster or an elevation adjuster of a multi-axis thruster of the untethered drone, the positioning subsystem, or both, to maintain the aerial reflector device in the specified location and the reflective surface at the specified orientation.

3. The WMN of claim 1, further comprising a tethered drone, wherein the aerial reflector device is attached to the tethered drone, wherein the aerial reflector device further comprises:

a global navigation satellite system (GNSS) radio to generate a current location of the aerial reflector device using timing signals transmitted along a line of sight from satellites;

a radio to communicate control data over a point-to-point (PtP) command and control (C2C) link with the first radio of the first HAN relay device, the first radio of the second HAN relay device, or both;

a three-axis accelerometer;

a positioning subsystem coupled to the reflective surface, the positioning subsystem configured to electrically or electromechanically control an orientation of the reflective surface;

a power supply subsystem to supply power to components of the aerial reflector device; and a micro-controller coupled to the GNSS radio, the radio, the three-axis accelerometer, the positioning subsystem, and the power supply subsystem, wherein the micro-controller is configured to:

receive control data from the radio, the control data comprising a specified location of the aerial reflector device and a specified orientation of the reflective surface such that the reflective surface provides the NLOS communication path between the first radio of the first HAN relay device and the first radio of the second HAN relay device;

receive the current location of the aerial reflector device from the GNSS radio;

receives acceleration data from the three-axis accelerometer to determine a current orientation of the aerial reflector device; and communicate one or more control signals to the positioning subsystem to maintain the aerial reflector device in the specified location and the reflective surface at the specified orientation.

4. The WMN of claim 1, wherein the aerial reflector device further comprises:

a global navigation satellite system (GNSS) radio to generate a current location of the aerial reflector device using timing signals transmitted along a line of sight from satellites;

a radio to communicate control data over a point-to-point (PtP) command and control (C2C) link with the first radio of the first HAN relay device, the first radio of the second HAN relay device, or both;

a three-axis accelerometer;

a positioning subsystem coupled to the reflective surface, the positioning subsystem configured to electrically or electromechanically control an orientation of the reflective surface; and a micro-controller coupled to the GNSS radio, the radio, the three-axis accelerometer, the positioning subsystem, wherein the micro-controller is configured to:

receive control data from the radio, the control data comprising a specified location and a specified orientation of the aerial reflective device such that the reflective surface provides the terrestrial NLOS communication path between the first radio of the first HAN relay device and the first radio of the second HAN relay device;

receive the current location of the aerial reflector device from the GNSS radio;

receive acceleration data from the three-axis accelerometer to determine a current orientation of the aerial reflector device; and communicate one or more control signals to the positioning subsystem to maintain the aerial reflector device in the specified location and the reflective surface at the specified orientation.

5. A system comprising:

a first home access node (HAN) relay device positioned at a first terrestrial location;

a second HAN relay device positioned at a second terrestrial location; and an aerial reflector device positioned at an aerial location above the first terrestrial location and the second terrestrial location, the aerial reflector device comprising a reflective surface that is positioned and oriented to provide non-line-of-sight (NLOS) communications between a first radio of the first HAN relay device and a first radio of the second HAN relay device.

6. The system of claim 5, wherein the aerial reflector device is positioned in the aerial location using at least one of mechanical mechanism, an aero-dynamical mechanism, or a buoyancy mechanism.

7. The system of claim 5, wherein the aerial reflector device is attached to a drone, wherein the aerial reflector device comprises:

a global navigation satellite system (GNSS) radio to generate a current location of the aerial reflector device using timing signals transmitted along a line of sight from satellites;

a radio to communicate data over a point-to-point (PtP) command and control (C2C) link with the first radio of the first HAN relay device, the first radio of the second HAN relay device, or both;

an accelerometer;

a positioning subsystem coupled to the reflective surface, the positioning subsystem configured to mechanically control an orientation of the reflective surface;

a micro-controller coupled to the GNSS radio, the radio, the accelerometer, the positioning subsystem.

8. The system of claim 7, wherein the positioning subsystem comprises:

an azimuth positioner configured to adjust an azimuth angle of the reflective surface; and an elevation positioner configured to adjust an elevation of the reflective surface, wherein the micro-controller is further configured to communicate the one or more control signals to the drone, the azimuth positioner, the elevation positioner, or any combination thereof.

9. The system of claim 7, wherein the micro-controller is configured to:

receive control data from the radio, the control data comprising a specified location and a specified orientation of the reflective surface such that the reflective surface provides the NLOS communication between the first radio of the first HAN relay device and the first radio of the second HAN relay device;

receive the current location of the aerial reflector device from the GNSS radio;

receive acceleration data from the accelerometer to determine a current orientation of the reflective surface; and communicate one or more control signals to a multi-axis thruster of at least one of a buoyant or aerodynamic object, the positioning subsystem, or both to maintain the aerial reflector device in the specified location and the reflective surface at the specified orientation.

10. The system of claim 9, wherein the aerial reflector device is powered through a tether coupled to the drone at a first end of the tether and coupled to a fixed object at a second end of the tether, the fixed object being secured to the ground or a structure on the ground, wherein the drone is at least one of a buoyant or aerodynamic object with or without propulsion.

11. The system of claim 5, wherein the aerial reflector device is secured to a first pole mount that is coupled to a pole, the pole having a second pole mount secured to the ground or a structure on the ground.

12. An aerial reflector device comprising:

a reflective surface;

a global navigation satellite system (GNSS) radio;

a radio to communicate data over a wireless link with a first radio of a first network device, a first radio of a second network device, or both;

an accelerometer;

a positioning subsystem coupled to the reflective surface, the positioning subsystem configured to electrically or electromechanically control a location and an orientation of the reflective surface;

a micro-controller coupled to the GNSS radio, the radio, the accelerometer, and the positioning subsystem, wherein the micro-controller is configured to position the aerial reflective device in an aerial location above the first network device and the second network device to provide non-line-of-sight (NLOS) communications between the first radio of the first network device and the first radio of the second network device.

13. The aerial reflector device of claim 12, wherein the micro-controller comprises:

a first interface coupled to the GNSS radio;

a second interface coupled to the radio;

a third interface coupled to the positioning subsystem; and a fourth interface coupled to the accelerometer.

14. The aerial reflector device of claim 12, wherein the micro-controller further comprises a fifth interface configured to be coupled to a drone.

15. The aerial reflector device of claim 12, further comprising a power supply coupled to the micro-controller, the GNSS radio, the radio, the positioning subsystem, and the accelerometer.

16. The aerial reflector device of claim 12, wherein the reflective surface is a flat circular disc.

17. The aerial reflector device of claim 12, further comprising a plurality of active components to control the reflective surface to beam-form a radiation pattern of reflected electromagnetic energy from the reflective surface.

18. The aerial reflector device of claim 14, wherein the micro-controller, to position the aerial reflective device, is configured to:

receive, over the wireless link via the radio, control data comprising a specified location of the aerial reflective device and a specified orientation of the reflective surface;

determine a current location of the aerial reflector device and a current orientation of the reflective surface using first data obtained from the GNSS radio and second data from the accelerometer;

determine a first adjustment, if any, to move the aerial reflective device to the specified location;

determine a second adjustment, if any, to orient the reflective surface to the specified orientation; and communicate one or more control signals to the drone, the positioning subsystem, or both to make the first adjustment, if any, and the second adjustment, if any.

19. The aerial reflector device of claim 12, wherein the first network device is a home access node (HAN) relay device, and wherein the second network device is a second HAN relay device.

20. The aerial reflector device of claim 12, wherein the first network device is a home access node (HAN) relay device, and wherein the second network device is a HAN device.

* * * * *